United States Patent
Peiffer et al.

(10) Patent No.: US 11,186,072 B2
(45) Date of Patent: *Nov. 30, 2021

(54) PEELABLE POLYESTER FILM, USE THEREOF AND PROCESS FOR PRODUCTION THEREOF

(71) Applicant: Mitsubishi Polyester Film GmbH, Wiesbaden (DE)

(72) Inventors: Herbert Peiffer, Mainz (DE); Stefan Bartsch, Mainz (DE); Martin Jesberger, Mainz (DE); Tobias Rentzsch, Bad Homburg (DE)

(73) Assignee: Mitsubishi Polyester Film GmbH, Wiesbaden (DE)

( * ) Notice: Subject to any disclaimer, the term of this patent is extended or adjusted under 35 U.S.C. 154(b) by 254 days.

This patent is subject to a terminal disclaimer.

(21) Appl. No.: 16/047,203

(22) Filed: Jul. 27, 2018

(65) Prior Publication Data

US 2019/0030874 A1    Jan. 31, 2019

(30) Foreign Application Priority Data

Jul. 31, 2017   (DE) .......................... 102017117328.5

(51) Int. Cl.
  *B32B 27/36*   (2006.01)
  *B32B 27/08*   (2006.01)
  (Continued)

(52) U.S. Cl.
  CPC .............. *B32B 27/36* (2013.01); *B32B 7/06* (2013.01); *B32B 27/08* (2013.01); *B32B 27/18* (2013.01);
  (Continued)

(58) Field of Classification Search
  None
  See application file for complete search history.

(56) References Cited

U.S. PATENT DOCUMENTS 4,876,146 A * 10/1989 Isaka .................. B32B 7/02
                                                  428/347
5,888,599 A *  3/1999 Bradt .................. B32B 27/08
                                                  428/35.7
(Continued)

FOREIGN PATENT DOCUMENTS

EP    0 144 948 A2    6/1985
EP    1 475 228 B1    11/2004
(Continued)

OTHER PUBLICATIONS

European Search Report, European Patent Application No. 18185770.7.

(Continued)

*Primary Examiner* — Vivian Chen
(74) *Attorney, Agent, or Firm* — ProPat, LLC; Cathy R. Moore

(57) ABSTRACT

A transparent peelable polyester film is provided having a base layer (B) with first and second surfaces. A layer (C) is applied on the base layer (B). A heat-sealable layer (A), peelable to APET AND RPET, is applied on the opposing surface of the base layer (B). The heat-sealable and peelable outer layer (A) is formed from
  (a) from 85 to 99% by weight of polyester and
  (b) from 1 to 15% by weight of other substances. The polyester is formed from 25 to 95 mol % of units derived from at least one aromatic dicarboxylic acid and from 5 to 75 mol % of units derived from at least one aliphatic dicarboxylic acid, and the polyester includes at least 10 mol % of units derived from linear or branched diols having more than 2 and the layer (C) includes crosslinked acrylate and/or methacrylate-based copolymers.

17 Claims, 5 Drawing Sheets

(51) Int. Cl.
| | |
|---|---|
| B32B 7/06 | (2019.01) |
| B32B 27/18 | (2006.01) |
| B32B 27/30 | (2006.01) |
| C08G 63/181 | (2006.01) |
| B65D 65/40 | (2006.01) |
| C08J 7/04 | (2020.01) |
| C08J 7/043 | (2020.01) |
| C08J 7/052 | (2020.01) |
| C08J 7/054 | (2020.01) |
| C08G 63/183 | (2006.01) |
| C08L 67/02 | (2006.01) |
| B32B 38/00 | (2006.01) |
| B32B 37/15 | (2006.01) |
| C09D 133/10 | (2006.01) |
| B05D 7/04 | (2006.01) |
| C09D 167/02 | (2006.01) |
| C09D 133/08 | (2006.01) |
| C09D 133/04 | (2006.01) |
| C08J 3/24 | (2006.01) |

(52) U.S. Cl.
CPC ............ *B32B 27/30* (2013.01); *B32B 27/308* (2013.01); *B65D 65/40* (2013.01); *C08G 63/181* (2013.01); *C08G 63/183* (2013.01); *C08J 7/043* (2020.01); *C08J 7/0427* (2020.01); *C08J 7/052* (2020.01); *C08J 7/054* (2020.01); *C08L 67/02* (2013.01); *B05D 7/04* (2013.01); *B05D 2502/00* (2013.01); *B05D 2508/00* (2013.01); *B32B 37/15* (2013.01); *B32B 37/153* (2013.01); *B32B 2038/0028* (2013.01); *B32B 2250/03* (2013.01); *B32B 2250/05* (2013.01); *B32B 2250/24* (2013.01); *B32B 2250/40* (2013.01); *B32B 2255/10* (2013.01); *B32B 2255/26* (2013.01); *B32B 2307/30* (2013.01); *B32B 2307/31* (2013.01); *B32B 2307/412* (2013.01); *B32B 2307/518* (2013.01); *B32B 2307/702* (2013.01); *B32B 2307/734* (2013.01); *B32B 2439/70* (2013.01); *B32B 2553/00* (2013.01); *C08J 3/24* (2013.01); *C08J 7/04* (2013.01); *C08J 2367/02* (2013.01); *C08J 2433/12* (2013.01); *C08J 2467/02* (2013.01); *C08L 2203/16* (2013.01); *C09D 133/04* (2013.01); *C09D 133/08* (2013.01); *C09D 133/10* (2013.01); *C09D 167/02* (2013.01); *Y10T 428/2495* (2015.01); *Y10T 428/2813* (2015.01); *Y10T 428/2817* (2015.01); *Y10T 428/2826* (2015.01); *Y10T 428/31786* (2015.04); *Y10T 428/31797* (2015.04); *Y10T 428/31935* (2015.04)

(56) References Cited

U.S. PATENT DOCUMENTS

| | | | | |
|---|---|---|---|---|
| 5,929,205 A | * | 7/1999 | Matsuba | C08F 291/02 528/498 |
| 6,270,888 B1 | * | 8/2001 | Rutter | B32B 27/18 428/212 |
| 7,211,306 B2 | * | 5/2007 | Peiffer | B32B 27/18 428/34.9 |
| 7,867,531 B2 | * | 1/2011 | Pockat | B32B 27/34 426/129 |
| 8,053,047 B2 | * | 11/2011 | Siegel | B32B 27/08 428/34.1 |
| 2002/0065346 A1 | * | 5/2002 | Murschall | C08L 67/02 524/323 |
| 2004/0052993 A1 | * | 3/2004 | Dawes | B32B 27/36 428/35.7 |
| 2004/0067284 A1 | * | 4/2004 | Sankey | B05D 7/04 426/106 |
| 2004/0086734 A1 | * | 5/2004 | Janssens | B32B 27/36 428/482 |
| 2004/0213967 A1 | * | 10/2004 | Peiffer | B32B 27/08 428/202 |
| 2005/0013953 A1 | * | 1/2005 | Ono | C08J 7/0427 428/35.3 |
| 2005/0106342 A1 | * | 5/2005 | Dawes | B32B 7/02 428/34.9 |
| 2005/0118412 A1 | * | 6/2005 | Peiffer | B32B 27/08 428/323 |
| 2005/0173050 A1 | * | 8/2005 | Peiffer | B32B 27/36 156/244.11 |
| 2008/0211629 A1 | * | 9/2008 | Evans | G06K 19/07749 340/10.1 |
| 2009/0017245 A1 | * | 1/2009 | Forloni | B32B 27/36 428/35.7 |
| 2010/0221391 A1 | * | 9/2010 | Deng | C08J 7/052 426/114 |
| 2012/0118617 A1 | * | 5/2012 | Bories-Azeau | B32B 27/36 174/255 |
| 2014/0065431 A1 | * | 3/2014 | Sakellarides | B32B 27/36 428/446 |
| 2014/0234493 A1 | * | 8/2014 | Forloni | B32B 27/30 426/113 |
| 2015/0183564 A1 | * | 7/2015 | Henderson | B65D 77/2096 220/359.3 |
| 2015/0275032 A1 | * | 10/2015 | Deak | C08J 7/043 428/195.1 |
| 2017/0321024 A1 | * | 11/2017 | Roberto | C08J 7/0427 |
| 2017/0341355 A1 | * | 11/2017 | Peiffer | B32B 27/36 |
| 2018/0134019 A1 | * | 5/2018 | Peiffer | B32B 27/08 |
| 2018/0281363 A1 | * | 10/2018 | Shoolbraid | B29C 48/022 |
| 2020/0079064 A1 | * | 3/2020 | Peiffer | B32B 27/325 |
| 2020/0079955 A1 | * | 3/2020 | Tamari | B32B 27/18 |

FOREIGN PATENT DOCUMENTS

| | | | |
|---|---|---|---|
| EP | 1529798 A1 | | 5/2005 |
| EP | 2 431 176 B1 | | 3/2014 |
| WO | WO 94/13476 A | * | 6/1994 |
| WO | WO 96/11933 A | * | 6/1996 |
| WO | WO 2009/013284 A | * | 1/2009 |
| WO | 2015/148685 A1 | | 10/2015 |
| WO | 2016/083521 A1 | | 6/2016 |

OTHER PUBLICATIONS

Ahlhaus, O.E.: Verpackung mit Kunststoffen [Packaging with plastics], Carl Hanser Verlag, p. 271, 1997, ISBN 3-446-17711-6).

Dörsam, E.:(Technical University of Darmstadt, summer semester 2012), "Printing Technology for Electronics, 4. Ink Transfer in the Printing Process", Jan. 6, 2012.

* cited by examiner

PEELABLE POLYESTER FILM, USE THEREOF AND PROCESS FOR PRODUCTION THEREOF

CROSS-REFERENCE TO RELATED APPLICATIONS

This application claims priority to German Patent Application 10 2017 117 328.5 filed Jul. 31, 2017 which is hereby incorporated herein by reference in its entirety.

FIELD OF THE INVENTION

The invention relates to a transparent, peelable polyester film consisting of a biaxially oriented base layer (B), of a further layer (C) applied to the base layer (B), and of a sealable and peelable outer layer (A) applied off-line on the base layer (B). The sequence of the layers is (A) (B) (C). The outer layer (A) features moderate to medium peelability, in particular in relation to ready-meal trays made of APET and made of RPET (ABET=amorphous, transparent polyethylene terephthalate (PET), RPET=at least to some extent recycled, amorphous, transparent PET). The outer layer (A) comprises polyester based on aromatic and aliphatic acids and on aliphatic diols. The invention further relates to the use of the film and to a process for the production of the said film.

BACKGROUND OF THE INVENTION

Transparent ready-meal trays made of APET or RPET which have a peelable seal using a film heat-sealed to the edge of the tray are used in particular for salads and fresh fruit. They are easy to use, and are therefore very popular. This can be seen by way of example from the fact that these products currently have double-digit percentage growth rates in Europe.

After preparation of salads or fresh fruit, these are packed in ready-meal trays. A film is heat-sealed to the edge of the tray, and seals the packaging and protects the ready-meal from exterior effects.

Heat-sealing of transparent ready-meal trays made of APET or RPET is achieved at sealing temperatures that are in essence from 110 to 150° C. Sealing time is generally less than one second, in order to ensure cost-effectiveness. At sealing temperatures higher than 150° C., ready-meal trays made of APET, and in particular ready-meal trays made of RPET, lose their dimensional stability, and tend to warp.

Relatively high sealing temperatures (from >135 to 150° C.) can be used with high-specification ready-meal trays made of APET which is substantially free from regrind and which has wall thicknesses about 200 μm or more. Low sealing temperatures (<135° C.) are used in particular when ready-meal trays have wall thicknesses of about 200 μm or less and high regrind content. The abbreviation RPET is often used for these latter trays.

Irrespective of the sealing temperature used, a requirement placed upon the pack—also applicable after storage in a refrigerator or freezer—is that the film applied by sealing can be peeled from the ready-meal tray in a fully satisfactory manner by exerting a perceptible force, without any resultant incipient tearing. The term generally used for this behaviour is "cold peel".

The film of the present invention can be heat-sealed to ready-meal trays made of APET or RPET, and is peelable. For a prescribed material and prescribed film thickness, the scalability and peelability of the film are determined mainly by the properties of the outer layer (A) sealed on the ready-meal tray.

The peelability of films can be determined easily in the laboratory by using a tensile stress-strain tester (e.g. Zwick) (cf. FIG. 1). For this test, strips of width 15 mm and length about 50 mm are cut out from the film and from the ready-meal tray, and are sealed to one another. The outer layer (A) forms the sealable layer of the film, and the internally situated layer of the ready-meal tray forms the sealable layer of the tray. The sealed strips are—as the figure shows—clamped into the tester clamps. The "angle" between the film clamped in the upper clamp and the tray strip is 180°. The tester clamps in this test are moved apart at a velocity of 200 mm/min, the intention here being to achieve full peeling of the film from the tray, without any resultant tearing or incipient tearing.

A film is considered peelable if the tensile force or the peel force (in N/15 mm of film width) rises up to a certain value/plateau and then remains approximately constant over the distance over which the two strips have been sealed to one another (cf. FIG. 2). No incipient tearing of the film occurs; instead, the film can be peeled as desired from the ready-meal tray by exerting a defined force.

The magnitude of the peel force (N/15 mm of film strip width) is determined to a decisive extent by the polymers used in the outer layer (A) (cf. FIG. 3, polymer 1 in comparison with polymer 2). The magnitude of the peel force is also by way of example dependent on the thickness of the outer layer (A), on the heat-sealing temperature used and on the heat-sealing time, and also on the pressure between the sealing jaws.

By way of example, peel force can rise sharply with heat-sealing temperature (cf. FIG. 3, polymer 1). As heat-sealing temperature increases there is an increasing risk here that the sealable layer (A) will lose its peelability. This means that a film that is peelable when a low heat-sealing temperature is used loses this property when the heat-sealing temperature exceeds a certain level. This behaviour is somewhat disadvantageous for the application, and has to be taken into account in the design of the sealable layer. The film must be amenable to heat-sealing within an adequately wide temperature range without any resultant loss of the desired peelability (cf. polymer 2 in FIG. 3). In practice, this temperature generally ranges from 110 to 150° C., preferably from 112 to 150° C. and particularly preferably from 115 to 150° C. Defined conditions are used here, in particular for sealing times (≤1 s) and applied pressures.

The heat-sealable and peelable layer (A) is applied to the polyester film (B) by means of off-line technology in an additional processing step subsequent to film production. This method begins with production of a polyester film (B) with defined properties by conventional processes. The resulting polyester film (B) is then coated "off-line" with the heat-sealable and peelable layer (A) in a coating system in a further processing step.

In this process, the polymer for the layer (A) is dissolved or dispersed in an organic solvent. The ready-to-use solution/dispersion is applied to the film by way of a suitable application process (e.g. knife coater (doctor), screen roll or gravure roll, die). The solvent is then evaporated in a drying oven, and the peelable polymer remains as solid, peelable layer (A) on the film.

There are currently various heat-sealable and peelable polyester films available in the market. Examples of differences between the films are the structure and the constitution of the outer layer (A). They are used in different applications corresponding to their peel properties.

The films are by way of example conventionally classified for application purposes as easy-peel films, medium-peel films and strong-peel films. The magnitude of the respective peel force in accordance with FIG. 2 is an essential quantifiable feature for distinguishing between these films. A classification is provided here as follows

| | |
|---|---|
| Easy peel | Peel force in the range of about 2 to 3 N per 15 mm of strip width |
| Medium peel | Peel force in the range of about 3 to 7 N per 15 mm of strip width |
| Strong peel | Peel force in the range of more than 7 N per 15 mm of strip width |

An important criterion here is that when the film peeled from the ready-meal tray no incipient tearing of the film is permitted. It must be possible to peel the polyester film without loss of its integrity from the ready-meal tray without, for example, leaving residues of the dry material of the coating on the edge of the tray. This point is important inter alia during the filling of the trays, because peel performance is tested at regular intervals during the filling as the trays, and the contents are resealed. Further use of the tray with contents is then possible despite "disruptive" quality monitoring, because it is possible to achieve fully satisfactory resealing of the tray. This "reworkability" is very important for the economics of the product, and is often a decisive factor in the selection of the films.

The market moreover places stringent optical requirements on the peelable polyester film, in particular in respect of haze <20% and clarity >80%, in order that the contents (e.g. the fresh salad or the fruit) can be clearly discerned. For the same reasons, it is moreover desirable that the peelable polyester film exhibits a good anticondensation effect.

Sealable and peelable PET films are known.

EP 1 475 228 B1 describes a coextruded, peelable, biaxially oriented polyester film with a base layer and with at least ore outer layer applied to the said base layer. The outer layer is heat-sealable, and features easy to medium peel, in particular in relation to ready-meal trays made of APET/CPET. The outer layer comprises polyester based on aromatic and aliphatic acids and on aliphatic diols. The outer layer moreover comprises a defined concentration of a polyester-incompatible polymer. The peel performance of the film in relation to ready-meal trays made of APET requires improvement.

WO 2015/148685 A1 claims a coating mixture which has been dissolved in a solvent and which is used on a surface of a packaging film. The coating mixture comprises the following constituents: a solvent and a heat-sealable polymer made of an amorphous or semicrystalline polyester or copolyester with glass transition temperature from −35 to 0° C. and with a ring-and-ball softening point of from 60 to 120° C., where the polymer is soluble in the solvents mentioned and comprises antiblocking additives. When the mixture is coated on a film and is dried, it provides a heat-sealable coating which can be processed at low temperatures in form-fill-seal machines. Because of the low glass transition temperature, films according to that invention have a tendency to seal to themselves when the wound films are stored. They are therefore always damaged during unwinding.

WO 2016/083521 A1 claims a biaxially oriented polyester film which consists of a polyester film and of a heat-sealable coating. The heat-sealable coating comprises one or more amorphous copolyesters based on units made of terephthalic acid and naphthalenedicarboxylic acid, and comprises at least one diol, where the heat-sealable coating comprises from 20 to 50% by weight of terephthalic acid units and from 5 to 25% by weight of naphthalenedicarboxylic acid units. In at least one of the two orientation directions, the polyester film has a high tear ratio of at least 37 gf/μm calculated from the tear initiation force measured in accordance with ASTM D1004 and the total film thickness. The film is heat-sealable and peelable in relation to containers made of polyester and aluminium. The peel performance of the film in relation to ready-meal trays made of APET, and in particular made of RPET, requires improvement. The peel force required by the film in relation to the materials mentioned is too low (easy peel).

EP 2 431 176 B1 describes a coextruded, peelable polyester film with a substrate layer and with at least one heat-sealable layer applied on the said substrate layer. The heat-sealable layer comprises
  i. a copolyester made of adipic acid and terephthalic acid and aliphatic glycol, where the molar ratios of adipic acid to terephthalic acid to aliphatic glycol are in the range 30-70/70-50/100, and the copolyester makes up at least 90% by weight of the total weight of the heat-sealable layer,
  ii. the thickness of the heat-sealable layer is in the range from 0.3 to about 3 μm,
  iii. the heat-sealable layer comprises one or more waxes.

The peel performance of the film in relation to ready-meal trays made of APET requires improvement, in particular at low temperatures. Because of the low glass transition temperature, films according to that invention tend to seal to themselves when the wound films are stored at an elevated temperature.

SUMMARY OF ADVANTAGE EMBODIMENTS OF THE INVENTION

It was an object of the present invention to provide a heat-sealable and peelable, biaxially oriented polyester film which has an off-line coating and which features, in relation to ready-meals trays, in particular in relation to ready-meal trays consisting of APET or of RPET, excellent sealing properties and excellent peel properties, and which does not have the disadvantages of the prior art. It is in particular intended to feature the following points/properties.

It is intended to exhibit medium peel in relation to ready-meal trays made of APET or made of RPET. The peel force is intended to be in the range from 3 to 7 N/15 mm.

The minimal sealing temperature of the heat-sealable and peelable layer in relation to ready-meal trays made of APET or made of RPET is intended to be 110° C., the maximal sealing temperature generally being about 160° C. (for a sealing time of 0.5 s and a defined applied pressure (see test methods hereinafter)).

The film is intended to be amenable to cost-effective production. This means by way of example that conventional industrial processes can be used for the production of the base film (layer B).

The optical properties of the film are intended to be very good. This means by way of example haze below 20%, clarity greater than 80% and transparency greater than 90%.

The film is intended to exhibit good winding performance and good processability, in particular during coating, during printing, after transport at elevated temperatures (e.g., in the case of transport where temperatures above 50° C. can arise), during lamination or during sealing of the coated film to the ready-meal tray.

In particular, the film is intended to have good winding properties and good unwinding properties. During the unwinding of the films, the individual laps of the film are not permitted to adhere to one another, even at an elevated temperature, for example 50 or 60° C. Adhesion between the individual laps of the film would make unwinding of the film difficult or indeed impossible (e.g. during division of the jumbo roll by cutting to give smaller rolls or during the unwinding of the smaller roll by customers).

It is moreover intended, that the film can be processed in high-speed machines. At the same time, it is intended here that there is no impairment of the excellent properties of the biaxially oriented polyester film used. Among these are in particular the mechanical properties of the film. The modulus of elasticity of the coated film should be greater than 3000 N/mm², and the shrinkage of the coated film should not be greater than 2.5%.

DETAILED DESCRIPTION OF ADVANTAGEOUS INVENTIVE EMBODIMENTS

The object is achieved via provision of a transparent peelable polyester film comprising a biaxially oriented polyester film (B) which has a first and a second surface, and comprising, applied on the first surface of the base layer (B), a further layer (C), and comprising, applied on the second surface of the base layer (B), a heat-sealable outer layer (A) that is peelable in relation to ready-meal trays made of APET and made of RPET, where the heat-sealable and peelable outer layer (A) is an off-line coating and consists of a) from 85 to 99% by weight of polyester and b) from 1 to 15% by weight of other substances, where the polyester is comprised of from 25 to 95 mol % of units derived from at least one aromatic dicarboxylic acid and from 5 to 75 mol % of units derived from at least one aliphatic dicarboxylic acid, where the sum of the dicarboxylic-acid-derived molar percentages is 100 and the polyester is comprised of at least 10 mol % of units derived from linear or branched dials having more than 2 carbon atoms, where the entirety of the diol components provides 100 molar percent and the layer (C) comprises crosslinked acrylate- and/or methacrylate-based copolymers.

Unless otherwise stated, the expression % by weight above and below always refers to the respective layer or the respective system in connection with which the expression is mentioned.

Figure 4:
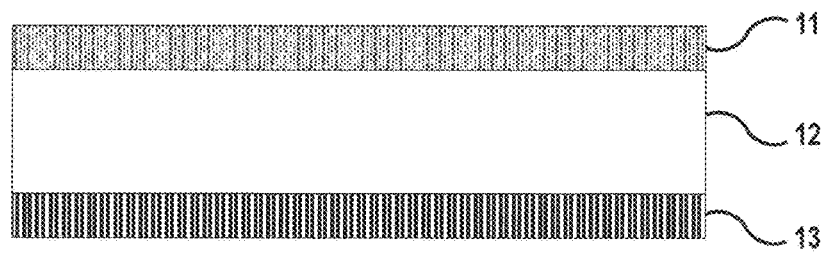
FIG. 4 depicts the layer structure of an exemplary inventive embodiment.

FIG. 4 depicts the layer structure of the invention. The film is comprised of at least three layers. A three-layer film of this type consists of the base layer (B), which has two surfaces, a first and a second surface. The layer (C) has been applied (11) on the first surface of the base layer (B) (12), and a heat-sealable and peelable outer layer (A) has been applied (13) by off-line coating on the second surface of the base layer (B), facing away from the layer (C). The layer sequence is therefore (A) (B) (C).

The total thickness of the peelable polyester film of the invention can vary within defined limits. It is from 3 to 200 µm, in particular from 4 to 150 µm, preferably from 5 to 100 µm, where the proportion of the layer (B), based on the total thickness, is preferably from 45 to 97%.

Heat-Sealable and Peelable Outer Layer (A)

The sealable and peelable outer layer (A) applied off-line to the biaxially oriented polyester film=base layer (B) consists mainly of, i.e. of at least 85% by weight of, a peel polyester. The peel polyester comprises polyesters comprised of units derived from aromatic and aliphatic dicarboxylic acids.

The quantity present of the units derived from the aromatic dicarboxylic acids in peel polyester is from 25 to 95 mol %, preferably from 40 to 90 mol %, particularly preferably from 50 to 88 mol %. The quantity present of the units derived from the aliphatic dicarboxylic acids in the peel polyester is from 5 to 75 mol %, preferably from 10 to 60 mol %, particularly preferably from 12 to 50 mol %, where the mol % data always give a total of 100%. Deviation from the abovementioned inventive ratios of aromatic and aliphatic dicarboxylic acids leads inter alia either to inadequate adhesion of the outer layer (A) on the base layer (B) (if the aromatic proportion of dicarboxylic acids is too small) or to a non-inventive peel force and/or minimal sealing temperature.

The peel polyesters of the invention can be mixtures (blends) of homopolyesters or else of copolyesters, or mixtures of co- and/or homopolyesters. Preference is given here to blends of homo- and copolyesters or blends of various copolyesters based on aromatic and aliphatic dicarboxylic acids and on aliphatic diols.

Examples of the aromatic dicarboxylic acids that can be used according to the invention and that can be present in the form of derived units in the peel polyester are terephthalic acid, isophthalic acid, phthalic acid and 2,6-naphthalenedicarboxylic acid. Preference is given to terephthalic acid and isophthalic acid.

Examples of the aliphatic dicarboxylic acids that can be used according to the invention and that can be present in the form of derived units in the peel polyester are succinic acid, glutaric acid, adipic acid, pimelic acid, suberic acid, azelaic acid and sebacic acid. Preference is given to azelaic acid, sebacic acid and adipic acid.

Examples of the aliphatic dials that can be used according to the invention and that can be present in the form of derived units in the peel polyester are ethylene glycol, 1,3-propanediol, 1,3-butanediol, 1,4-butanediol, 1,5-pentanediol, 2,2-dimethyl-1,3-propanediol, diethylene glycol, triethylene glycol, 1,4-cyclohexanedimethanol and neopentyl glycol. Preference is given to ethylene glycol, diethylene glycol, 1,2-propanediol, butanediol and neopentyl glycol.

The peel polyester generally includes the following "dicarboxylic-acid-derived units" and "diol-derived units", based in each case on the total quantity of dicarboxylic-acid-based and, respectively, diol based repeat units from 25 to 85 mol %, preferably from 30 to 80 mol % and particularly preferably from 35 to 70 mol %, of terephthalate from 5 to 50 mol %, preferably from 10 to 45 mol % and particularly preferably from 15 to 40 mol %, of isophthalate from 5 to 50 mol %, preferably from 5 to 40 mol % and particularly preferably from 5 to 30 mol %, of adipate from 0 to 30 mol %, preferably from 0 to 20 mol % and particularly preferably from 0 to 10 mol %, of azelate from 5 to 50 mol %, preferably from 5 to 40 mol % and particularly preferably from 5 to 30 mol %, of sebacate more than 10 mol %, preferably more than 11 mol % and particularly preferably more than 12 mol %, of ethylene glycol one or more diols selected from the group of $C_3$ to $C_7$ diols, and di-, tri- or tetra-$C_2$ to $C_4$ alkylene glycols, and also combinations thereof, in quantities greater than 10 mol %. The expression $C_2$ to $C_7$ diols means in particular: propylene, butylene and neopentyl glycol. The expression di- to tetraalkylene glycols means in particular: diethylene glycol, triethylene glycol or dipropylene glycol.

According to the invention, the glass transition temperature $T_g$ of the peel polyester of the outer layer (A) is from 0 to 30° C. It is preferably from 0 to 27° C. and particularly preferably from 0 to 25° C. If the $T_g$ of the polyester is below 0° C., the film is not amenable to reliable further processing. The susceptibility of the outer layer (A) to adhesion in relation to itself and in relation to the outer side of the peel film is so great that it blocks on winding and then cannot be further processed. This adhesion in the wound film is attended by frequent film break-offs, in particular during unwinding of the film. If, on the other hand, the $T_g$ is above 30° C., the outer layer (A) in particular no longer provides the desired peeling at low sealing temperatures (minimal sealing temperature 110° C.). The film moreover has increased susceptibility to incipient tearing or to break-off during peeling from the ready-meal tray, and this is undesirable. The sealing temperatures and glass transition temperatures of the invention are obtained via compliance with the constitution of the invention for the peel polyester (see above).

According to the invention, the SV value of the peel polyester of the outer layer (A) is from 200 to 2000. The SV value is preferably from 250 to 1900 and particularly preferably from 300 to 1900. If the SV value is less than 200, it becomes impossible to comply with the required seal seam strength of the outer layer (A) of from 3 to 7 N/15 mm in the temperature range of the invention in relation to ready-meal trays made of APET or made of RPET. Peel force is too low. If, on the other hand, the SV value is greater than 2000, the polyester is too viscous and by way of example is difficult to dissolve or to disperse in the solvent. The SV value must be determined here by a method based on that described in the experimental section.

The mass of the dry outer layer (A) of the film of the invention is moreover in the range from 1 to 6 g/m², preferably in the range from 1.2 to 8 g/m² and particularly preferably in the range from 1.4 to 6 g/m². If the application weight of the outer layer (A) is more than 8 g/m², peel force increases significantly and is no longer within the range of the invention. The peel performance of the film is moreover impaired: incipient tearing of the film occurs to an increased extent during peeling from the ready meal tray. If, in contrast, it is less than 1 g/m², the film is no longer heat-sealable and peelable within the temperature range of the invention.

From 1 to 15% by weight of the material of the outer layer (A) consists of other substances such as particles, additives, auxiliaries and/or other additional substances conventionally used in polyester film technology. Other additional substances that can be used for the outer layer (A) are antiblocking agents, lubricants, and in particular suitable antifogging agents, these being added in defined concentrations to the peel polyester, or to the solution consisting of peel polyester, inclusive of other substances and solvents.

The outer layer (A) has characteristic features. Its minimal sealing temperature in relation to ready-meal trays made of APET and made of RPET is not above 115° C., preferably not above 112° C. and particularly preferably not above 110° C., and its seal seam strength (=peel force) in relation to ready-meal trays made of APET and made of RPET is at least 3.0 N, preferably at least 3.1 N, particularly preferably at least 3.2 N (based in each case on 15 mm of film width). The maximal sealing temperature of the outer layer (A) in relation to ready-meal trays made of APET and made of RPET is about 160° C., preferably 155° C. and particularly preferably 150° C., and within the entire sealing range from 110 to 160° C. a film is obtained that is peelable in relation to ready-meal trays made of APET and made of RPET.

Peel forces for the preferred ranges stated above can be described in numeric terms. In accordance with the present investigations, the following relationship between the sealing temperature θ (in ° C.) and the peel force F (in N/15 mm) can be used to correlate the peel forces according to the present invention.

$$0.018 \cdot \theta/° C. + 1 \leq \text{peel force } F/N \text{ per 15 mm} \leq 0.03 \cdot \theta/° C. + 2.5$$

$$120 \leq \theta/° C. \leq 150$$

Figure 5:
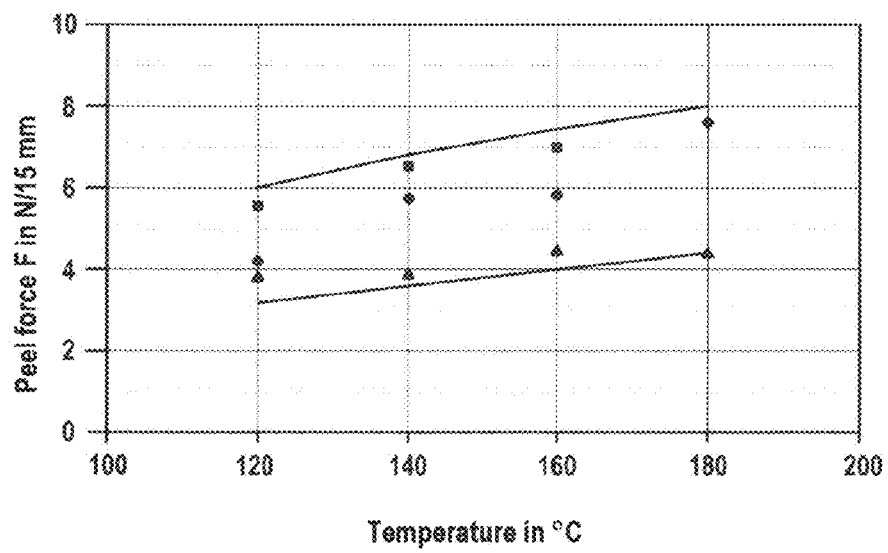
FIG. 5 is a graphic illustration of the relationship between sealing temperature and peeling force.

FIG. 5 is a graph illustrating this relationship.

Antiblocking Agent in the Layer (A)

It is advantageous to carry out further modification of the heat-sealable and peelable outer layer (A) in order to improve handling of the film and processability of the film (winding of the film onto the roll and unwinding therefrom) on the respective machines (printing and sealing), and in particular also in order to improve the performance of the film during peeling from the ready-meal tray.

This is most effectively achieved with the aid of suitable antiblocking agents which are optionally added to the sealable layer, and specifically in quantities that prevent blocking of the film, improve the performance of the film during peeling from the ready-meal tray, and further optimize the entire processing behaviour of the film.

It has proven advantageous for the outer layer (A) to comprise particles of a defined size in a defined concentration and optionally in a defined grain size distribution. It is also possible to add, to the outer layer (A), mixtures of two or more different particle systems, or mixtures of particle systems of the same chemical constitution but of different particle size.

Conventional Antiblocking agents (also termed "pigments" or "particles") are inorganic and/or organic particles, for example calcium carbonate, amorphous silica, talc, magnesium carbonate, barium carbonate, calcium sulfate, barium sulfate, lithium phosphate, calcium phosphate, magnesium phosphate, aluminium oxide, lithium fluoride, or salts of calcium, of barium, of zinc or of manganese of the dicarboxylic acids used in the outer layer (A) in derived form, carbon black, titanium dioxide, kaolin, or crosslinked polystyrene particles or crosslinked polymer particles based on acrylic acid derivatives.

The particles, in the respectively advantageous concentrations, by way of example in the form of glycolic dispersion, can be added to the outer layer (A) during production of the peel polyester (i.e. during polycondensation thereof) or to the solvent-based precursor system for the outer layer (A) during lacquer production (after polycondensation).

Particles preferred in the invention are synthetic, amorphous $SiO_2$ particles in colloidal form. The particles become bound very effectively into the polymer matrix, and produce only a small number of vacuoles. Vacuoles can be produced by way of example during drying of the lacquer; they generally increase haze, and therefore have little suitability for the present invention. Reference is made to the prior art for the production of the $SiO_2$ particles; the process is disclosed in detail by way of example in EP 1 475 225 B1.

It has proven advantageous to use particles with median particle diameter $d_{50}$ from 2.0 to 8 µm, preferably from 2.5 to 7 µm and particularly preferably from 3.0 to 6 µm. When particles with $d_{50}$ below 2.0 µm are used, there is no favourable effect of the particles by way of example on winding of the film onto the roll or unwinding therefrom, and on the performance of the film during peeling from the ready-meal tray. The film is susceptible by way of example to incipient tearing or tear-propagation during unwinding, and this is undesirable. Particles with diameter greater than 8 µm generally cause problems during processing and lacquer application (blocked filters).

It is preferable that in the outer layer (A) the diameter $d_{50}$ of the particles is greater than the thickness of the said layer. It has proved to the advantageous to select a diameter/layer thickness ratio of at least 1.2, preferably at least 1.3 and particularly preferably at least 1.4. In these cases there is a particularly favourable effect of the particles in particular on the unwinding performance of the film.

For provision of the desired peel properties and of the desired good winding, it has proved to be advantageous for the outer layer (A) to comprise particles in a concentration of from 0.1 to 10% by weight. The concentration of the particles is preferably from 0.5 to 8.0 by weight and particularly preferably from 1.0 to 6.0 by weight. If, in contrast, the outer layer (A) of the film comprises particles in a concentration of less than 0.1 by weight, there is then no favourable effect on winding of the film. If, in contrast, the outer layer (A) of the film comprises particles in a concentration of more than 10% by weight, the haze of the film becomes excessive.

It has moreover proved to be advantageous to adjust the arithmetic mean value of the absolute ordinate values t of the outer layer (A) via appropriate use of the abovementioned particles in such a way that the $S_a$ value thereof is greater than 60 nm. Preference is given to an $S_a$ value greater than 80 nm, and particular preference is given to an $S_a$ value greater than 100 nm.

Antifogging Agent in the Layer (A)

In order to achieve the desired low haze and high clarity of the peelable polyester film, which is also intended to be maintained during storage of the finished sealed pack, e.g. in the supermarket prior to consumption, it is particularly advantageous for the outer layer (A) to have good antifogging properties. To this end, the outer layer (A) comprises suitable antifogging agents in the desired concentration. Examples of suitable antifogging agents are surfactants, where this term means molecules consisting of a hydrophobic and a hydrophilic moiety, therefore being amphiphilic. The surfactants here can be of nonionic, cationic, anionic or zwitterionic type. It is moreover possible to use polymeric surfactants or protective colloids as antifogging agents.

Particularly suitable materials are anionic surfactants preferably selected from the group of the alkyl sulfates, alkylbenzene sulfates, alkyl ether sulfates or sulfosuccinic esters. Very particular preference is given to surfactants selected from the group of the sulfosuccinic esters (sodium dioctyl sulfosuccinate), e.g. sodium diethylhexyl sulfosuccinate, sodium lauryl sulfate.

The concentration of the antifogging agent used in the outer layer (A) is from 0.01 to 5% by weight, preferably from 0.03 to 4.0% by weight, where the concentration of the surfactant in particular depends on the desired antifogging properties. Good antifogging/anticondensation properties of the surface of outer layer (A) are achieved when no formation of fine droplets is observed on the surface and at the same time the coating has good resistance to removal by washing.

An essential requirement for good anticondensation properties is high surface tension, or a small contact angle of the surface of outer layer (A). Anticondensation properties are adequate if the surface tension of the outer layer (A) is at least 55 mN/m, preferably at least 58 mN/m and particularly preferably at least 61 mN/m.

In the off-line coating process, the outer layer (A) in the form of a liquid coating composition, i.e. in the form of lacquer, is applied to the base layer (B). In a method that has proved advantageous for the production of the lacquer, the "solid components", for example the peel polymer(s), and also the content of other substances, e.g. the antiblocking agents and/or antifogging agents, are dissolved in an organic solvent. It is possible here that the coating components are respectively individually dissolved or dispersed and that the respective solutions or dispersions are then mixed with one another, or that the said components are simultaneously provided and then dissolved/dispersed in the solvent. It is preferable to use a solvent mixture of ethyl acetate (EA) and methyl ethyl ketone (MEK) as continuous phase in the production of the lacquer. The proportion of MEK here is up to 50% by weight, preferably up to 40% by weight, based on the total composition of the solvent mixture. It is particularly preferable to provide exclusively EA as continuous phase.

Use of the abovementioned solvents particularly facilitates achievement of criteria and threshold values required by food legislation, thus facilitating the inventive use of the films coated with the lacquer in food packaging. Use of EA moreover reduces solvent-based costs of production and of disposal, thus permitting particularly cost-effective production of the film of the invention.

The "solids content" of the lacquer, or the content of substances other than the solvent in the lacquer, is at least 20% by weight, preferably at least 23% by weight and ideally at least 25% by weight. The upper limits are set via process conditions, and relate to the processability of the lacquer. If solids content is below 20% by weight, it is impossible to achieve full cover of the film by the lacquer, and uncoated film sections and drying phenomena (coffee-stain effect) occur.

In order to achieve good wetting of the polyester film by the solution and good adhesion of the peel polyester on the biaxially oriented polyester film, it is advantageous, before coating, to begin by corona-pretreating the surface.

Base Layer (B)=Biaxially Oriented Polyester Film

The film of the present invention comprises a base layer (B), which can be formed by a transparent biaxially oriented single-layer polyester monofilm or by a multilayer coextruded polyester film.

The base layer (B) here consists of at least 80% by weight of thermoplastic polyester. Materials suitable for this purpose are polyesters made of ethylene glycol and terephthalic acid (=polyethylene terephthalate, PET), made of ethylene glycol and naphthalene-2,6-dicarboxylic acid (=polyethylene-2,6-naphthalate, PEN), made of ethylene glycol or propylene 1,3-glycol and 2,5-furandicarboxylic acid (FDCA), made of 1,4-bishydroxymethylcyclohexane and terephthalic acid (=poly-1,4-cyclohexanedimethylene terephthalate, PCDT), and also made of ethylene glycol, naphthalene-2,6-dicarboxylic acid and biphenyl-4,4'-dicarboxylic acid (=polyethylene 2,6-naphthalate bibenzoate, PENBB). Preference is given to polyesters which comprise ethylene units and which based on the dicarboxylate units consist of at least 90 mol %, particular preferably at least 95 mol %, of terephthalate units or 2,6-naphthalate units. The remaining monomer units derive from other dicarboxylic acids and, respectively, diols. It is advantageously also possible to use, for the base layer (B), copolymers or mixtures or blends made of the homo- and/or copolymers mentioned; (in the case of the quantity stated for the dicarboxylic acids, the total quantity of all of the dicarboxylic acids is 100 mol %; analogously, the total quantity of all of the diols is also 100 mol %).

Suitable other aromatic dicarboxylic acids are preferably benzenedicarboxylic acids, naphthalenedicarboxylic acids (for example naphthalene-1,4- or 1,6-dicarboxylic acid), biphenyl-x,x'-dicarboxylic acids (in particular biphenyl-4,4'-dicarboxylic acid), diphenylacetylene-x,x'-dicarboxylic acids (in particular diphenylacetylene-4,4'-dicarboxylic acid) or stilbene-x,x'-dicarboxylic acids. Among the cycloaliphatic dicarboxylic acids mention may be made of cyclohexanedicarboxylic acids (in particular cyclohexane-1,4-dicarboxylic acid). Among the aliphatic dicarboxylic acids the ($C_3$-$C_{19}$) alkane diacids have particular suitability, where the alkane moiety can be straight-chain or branched.

Examples of suitable other aliphatic diols are diethylene glycol, triethylene glycol, aliphatic glycols of the general formula HO—$(CH_2)_n$—OH, where n is an integer from 3 to 6 (in particular propane-1,3-diol, butane-1,4-diol, pentane-1,5-diol and hexane-1,6-diol) and branched aliphatic glycols having up to 6 carbon atoms, and cycloaliphatic, optionally heteroatom-containing diols having one or more rings. Among the cycloaliphatic dials mention may be made of cyclohexanediols (in particular cyclohexane-1,4-diol). Suitable other aromatic dials have by way of example the formula HO—$C_6H_4$—X—$C_6H_4$—OH, where x is —$CH_2$—, —$C(CH_3)_2$—, —$C(CF_3)_2$—, —O—, —S— or —$SO_2$—. Bisphenols of the formula HO—$C_6H_4$—$C_5H_4$—OH are also suitable.

The base layer (B) is particularly advantageously a biaxially oriented polyester film comprised of a copolyester whose dicarboxylic acid components derive from terephthalic-acid-derived units and from a small quantity (<5 mol %) of isophthalic-acid-derived units. In this case the film is particularly easy to produce. The base layer (B) then in essence comprises a polyester copolymer comprised mainly of terephthalic acid and isophthalic acid units and of ethylene glycol units (>97 mol % of diol units).

The polyesters can be produced by the transesterification process. This starts from dicarboxylic esters and diols, which are reacted with the conventional transesterification catalysts, for example salts of zinc, of calcium, of lithium and of manganese. The intermediates are polycondensed in the presence of well known polycondensation catalysts, for example antimony trioxide, titanium oxide or esters, or else germanium compounds. The production process can equally well proceed by the direct esterification process in the presence of polycondensation catalysts. This starts directly from the dicarboxylic acids and the diols.

It has proven particularly advantageous to polycondense the intermediates in the presence of titanium dioxide or germanium compounds and, respectively, to carry out the direct esterification processes in the presence of polycondensation catalysts such as titanium dioxide or germanium compounds. The biaxially oriented polyester film is therefore antimony-free, or at least has low antimony content. In the particularly preferred case, a desirable biaxially oriented polyester film comprises no antimony and can therefore be used in packaging applications where the film has direct contact with food.

Antiblocking Agent in the Base Layer (B)

In order to achieve a further improvement in the processing performance of the film, it is advantageous that particles are likewise incorporated into the base layer (B). It has proved advantageous here to comply with the following conditions a) the median particle diameter $d_{50}$ of the particles should be from 1.5 to 6 μm. It has proved to be particularly advantageous here to use particles with $d_{50}$ from 2.0 to 5 μm, particularly from 2.5 to 4 μm.

b) the particles should be present in a concentration of from $1 \times 10^{-5}$ to 5% by weight. The concentration of the particles is preferably from $1.1 \times 10^{-5}$ to 4% by weight and particularly preferably from $1.2 \times 10^{-5}$ to 3% by weight.

The base layer (B) of the peelable polyester film of the invention here can be comprised of one layer or a plurality of layers (i.e. at least two layers). A three-layer structure of the base layer (B) with a structure made of the three layers B', B" and B' or B', B" and B''', where B" is the middle layer and B' and, if present, B''' respectively are the external layer(s) of the base layer, has proved to be particularly advantageous for achieving the abovementioned properties, in particular the very good optical properties required from the peelable polyester film. As mentioned above, the structure of the base layer (B) comprises each of the individual layers B', B" and B'''. The quantity of the particles in the coextruded base layer B" of this three-layer film should be smaller than in the two coextruded layers B' (or B' and B'''), which preferably have the same structure, or else can be different (B' and B''').

The quantity of the particles in the layer (B") in the three-layer biaxially oriented polyester film of type (B'B"B''') or (B'B"B''') is advantageously intended to be from 0 to 2.0% by weight, preferably from 0 to 1.5% by weight, in particular from 0 to 1.0% by weight. It has proved to be particularly advantageous to incorporate, into the base layer, only particles that pass into the film by way of the regrind (recyclate) of the same material. The optical properties of the film are then particularly good, in particular the haze of the film.

The thickness of the two layers B' (or B' and B''') can be identical or different; their thickness is generally respectively from 0.5 to 5 μm.

It has proved to be advantageous for the processing of the polymers, and in particular for achieving the desired good optical properties of the peelable polyester film, to select the polymers for the base layer (B") and for the other layers (B' and/or B''') of the biaxially oriented polyester film in a manner such that the viscosities of the respective polymer melts do not differ excessively. Otherwise, it is likely that the finished film will exhibit additional elevations/projections, problematic flow effects, or streaking. The SV value is in turn used to describe the viscosity ranges of the melts.

SV values for commercially available polyethylene terephthalates suitable for the production of biaxially oriented polyester films are in the range from 600 to 1000. In order to ensure fully satisfactory quality of the film for the purposes of the present invention, the SV value of the polymers for the layers B' (or B' and B''') should be in the range from 500 to 1200, preferably in the range from 550 to 1150, with particular preference, in the range from 600 to 1000. The SV values of the polymer melts for the coextruded base layers and the other coextruded layers should differ by no more than 200 units, preferably by no more than 150 units, and in particular no more than 100 units. In all of the cases mentioned, it is moreover advantageous for the present invention for the viscosities of the two layers (B' and/or B''') to be lower than the viscosity of the layer (B").

The biaxially oriented polyester film (B) can also comprise conventional additives, for example stabilizers (UV, hydrolysis), flame-retardant substances or fillers. They are advantageously added to the polymer or polymer mixture before melting in the extruder.

Coating (C)

The layer (C) is formed according to the invention by using suitable process for in-line or off-line coating of one of the two surfaces of the base layer (B). Preference is given to in-line coating before transverse stretching. According to the invention, acrylic copolymers are used for this coating. The acrylic copolymers preferably used consist in essence of at least 50% by weight of one or more polymerized acrylic and/or methacrylic monomers and from 1 to 15% by weight of a copolymerizable comonomer which is capable, in the copolymerized state on exposure to elevated temperature, of forming intermolecular crosslinks, optionally without addition of any separate resinous crosslinking agent.

The quantity present of the acrylic component of the coating copolymers is preferably from 50 to 99% by weight, and it preferably consists of an ester of methacrylic acid, in particular an alkyl ester, the alkyl group of which comprises up to ten carbon atoms, examples being the methyl, ethyl, n-propyl, isopropyl, n-butyl, isobutyl, tertiary butyl, hexyl, 2-ethylhexyl, heptyl and n-octyl group. Acrylic copolymers derived from a lower alkyl acrylate (C1 to C4), in particular ethyl acrylate, in combination with a lower alkyl methacrylate, give particularly good processability of the peelable polyester film, in particular good windability. Very particular preference is given to use of copolymers of an alkyl acrylate, e.g. ethyl acrylate or butyl acrylate, combined with an methacrylate, e.g. methyl methacrylate, in particular in identical molar proportions and in a total quantity of from 70 to 95% by weight. The proportion present of the acrylate comonomer of these acrylic/methacrylic combinations is preferably from 15 to 65 mol %, and the proportion present of the methacrylate comonomer is preferably generally greater by from 5 to 20 mol % than the proportion of the acrylate comonomer. The combination preferably comprises a proportion of from 35 to 85 mol % of the methacrylate.

Suitable comonomers can optionally be used in order to form crosslinks, in order to increase solvent resistance, examples being N-methylolacrylamide, N-methylolmethacrylamide and the corresponding ethers; epoxy materials such as glycidyl acrylate, glycidyl methacrylate and allyl glycidyl ether; monomers comprising carboxy groups, e.g. crotonic acid, itaconic acid or acrylic acid; anhydrides such as maleic anhydride or itaconic anhydride; monomers comprising hydroxy groups, e.g. allyl alcohol and hydroxy ethyl or hydroxy propyl acrylate or methacrylate; amides such as acrylamide, methacrylamide or maleamide, and isocyanates such as vinyl isocyanate or allyl isocyanate. Among the abovementioned crosslinking comonomers, preference is given to N-methylolacrylamide and N-methylolmethacrylamide, and specifically primarily because copolymer chains comprising one of these monomers are capable, when exposed to elevated temperatures, of condensing with one another and thus forming the desired intermolecular crosslinks. The optionally desired solvent resistance of the preferred acrylate coating can also, however, be achieved via the presence of a foreign crosslinking agent, e.g. of a melamine- or urea-formaldehyde condensate. If no solvent resistance is required, crosslinking agents can be omitted.

The coating (C) described above of the present invention is described in detail in EPA 0 144 948, which is expressly incorporated by way of reference at this point.

The preferred acrylate coating is applied to one side of the base layer (B), and in essence serves to improve winding, in particular to improve unwinding of the film after storage (at elevated temperatures). The coating formulation can comprise known additions such as antistatic agents, wetting agents, surfactants, pH regulators, antioxidants, dyes, pigments, antiblocking agents such as colloidal $SiO_2$, etc. It is normally advisable to incorporate a surfactant in order to increase the ability of the aqueous coating to wet the polyester support film.

Process

The present invention moreover provides a process for the production of the sealable and peelable polyester film. It comprises the production of a base layer (B) by coextrusion, the biaxial stretching of the base layer (B), heat-setting and wind-up of the stretched base layer (B).

The process moreover comprises the off-line coating of the base layer (B) on the uncoated side with the outer layer (A).

The process moreover comprises, either between the first and the second stretching step or off-line after the production of the biaxially oriented PET film, the coating of the base layer (B) with the acrylic-crosslinking layer (C).

The process preferably comprises the production of a multilayer base layer (B) comprising the layers B" and B' or B" and B'''. The process particularly preferably comprises the production of a multilayer base layer (B) comprising the layers B', B" and B' or the layers B', B" and B'''. The layer B" is the middle layer, and the layers B' and, if present, B''' respectively represent(s) the external layer(s) of the base layer. Production of these layers is achieved by means of coextrusion.

The present invention therefore provides a process for the production of a peelable polyester film according to the invention, characterized in that a polymer for the base layer (B), which has a first and a second surface, or a plurality of polymers for the individual layers B', B" and B''' or B', B" and B''' of the base layer (B) is/are melted in one or more extruders, and is/are shaped in a single-layer die or coextrusion die to give a flat melt film, which is then drawn off with the aid of a chill roll, biaxially stretched, heat-set and rolled up, where the biaxial stretching comprises longitudinal stretching and transverse stretching, and where, to form the outer layer (A), a peel-coating composition is applied in liquid form to the first surface of the base layer (B) off-line by means of conventional coating technology, and is dried, and the resultant film is then again wound up, where the layer (C) is formed by (a) applying, between the longitudinal stretching and the transverse stretching, a coating composition in-line in liquid form to the second surface of the base layer (B) to form the layer (C), or (b) applying, before or after the off-line coating with the outer layer (A), a coating composition in liquid form off-line to the second surface of the base layer by means of conventional coating technology, to form the layer (C).

Biaxially Oriented Polyester Film=Base Layer (B)

The transparent, biaxially oriented polyester film (=base layer (B) or (B'B"B') or (B'B"B''')) is produced by the conventional coextrusion process. It is preferable to produce a polyester film with the layer structure (B'B"B' or B'B"B'''), with which a film with good optical properties can be produced particularly effectively. In this preferred three-layer film structure with a layer (B") and with the two layers (B') or, respectively, the layers (B' and B'''), the particle concentration in the layer (B") is preferably lower than that in the two layers (B') or, respectively in the layers (B' and B'''). The particle concentration in the layer (B") should be selected in a manner that has a favourable effect on the haze and gloss of the film. In the case of a three-layer film of the type mentioned, the particle concentration in the layer (B") will be from 0 to 0.06% by weight, preferably from 0 to 0.03% by weight and in particular from 0 to 0.01% by weight. The diameter of the particles used is not in principle subject to any restriction, but particular preference is given to particles with $d_{50}$ greater than 1 μm. The concentration of the particles in the layers B' or the layers B' and B''' is from 0.01 to 0.2% by weight, preferably from 0.02 to 0.16% by weight and particularly preferably from 0.030 to 0.12% by weight, and depends in essence on the size of the particles used.

In the case of the coextrusion process, by way of example, after extrusion of the respective melts in separate extruders, these are shaped to give flat melt films in a coextrusion die, and mutually superposed. The multilayer film is then drawn off with the aid of a chill roll and optionally other rolls, and solidified. It has proved here to be particularly advantageous for the technology of the process (mixing of the various components) to use a twin-screw extruder with vent(s) to extrude the polymers at least for the layers (B') or, respectively, for the layers (B' and B'''). This method produces a film with fully satisfactory optical properties, e.g. no clouding or streaks. This type of film has particularly good further processing properties, in particular very good printing properties.

The biaxial stretching of the film is generally carried out sequentially. The sequential stretching preferably begins with longitudinal stretching, with subsequent transverse stretching. The longitudinal stretching can be achieved with the aid of two rolls rotating at different speeds corresponding to the desired stretching ratio. An appropriate tenter frame is generally used for the transverse stretching.

The temperature at which the stretching is carried out can vary within a relatively wide range, and depends on the desired properties of the film. The longitudinal stretching is generally carried out in the temperature range from 60 to 130° C. (heating temperatures from 60 to 130° C.), and the transverse stretching is generally carried out in the temperature range from 90° C. (start of stretching) to 140° C. (end of stretching). The longitudinal stretching ratio is in the range from 2.0:1 to 5.5:1, preferably from 2.3:1 to 5.0:1. The transverse stretching ratio is generally in the range from 2.4:1 to 5.0:1, preferably from 2.6:1 to 4.5:1.

Application of the Layer (C)

Coating of the film (B) with the acrylic-crosslinking layer (C) is achieved either in-line, preferably between the first and the second stretching step, or off-line after the production of the biaxially oriented PET film, before or after coating with the coating composition to form the layer (A).

In the case of the in-line coating that is preferably used, one of the two surfaces of the base layer (B) is coated with a layer (C) before the transverse stretching. In the case of off-line coating, the layer (C) is preferably applied, after the production of the outer layer (A).

The layer (C) serves to improve processing performance, in particular to improve winding performance, very particularly to improve the unwinding performance of the peelable polyester film.

According to the invention, the polyester film is coated with a functional coating in a manner such that the thickness of the coating on the finished polyester film is preferably from 5 to 200 nm, particularly preferably from 20 to 150 nm, very particularly preferably from 30 to 80 nm. It is particularly preferable to apply the layer (C) by means of the reverse gravure-roll coating process, in which the coatings can be applied extremely homogeneously in layer thicknesses up to 200 rim. Preference is likewise given to application by the Meyer rod process, with which relatively high coating thicknesses can be achieved. The coating is preferably applied in the form of solution, suspension or dispersion, particularly preferably in the form of aqueous solution, suspension or dispersion.

The substances mentioned are applied in the form of dilute, aqueous solution or dispersion to one of the two film surfaces, and then the solvent is evaporated. If the coating is applied in-line before the transverse stretching, the heat-treatment in the transverse stretching and in the subsequent heat-setting is sufficient to evaporate the solvent and dry the coating.

In the heat-setting that follows, the film is held at a temperature of from 150 to 250° C. for a period of about 0.1 to 10 s. The film is then wound up in conventional manner.

Production of the Outer Layer (A)

The production of the heat-sealable and peelable polyester film of the invention moreover comprises a further, independent process step in which the coating composition for the formation of the layer (A) is applied off-line. The peel-coating composition is applied in liquid form here (from solution/dispersion) by means of conventional coating technology in the desired thickness to the base film (B), on the surface facing away from the layer (C).

Conventional coating technologies are inter alia reverse-roll coating or reverse-gravure coating, forward-gravure coating, Meyer-bar coating, coating by means of casting rolls, coating by means of flow coater, curtain coating, spray coating and doctor (casting knife) coating.

A typical coating system—also termed lacquering system—consists essentially of an unrolling unit, a corona-pretreatment unit, one or more application units, a dryer and a roll-up unit.

The coating for the formation of the outer layer (A) is preferably applied to the polyester film by way of a gravure roll or coating roll running in the same direction as the web (forward gravure). The operating width is preferably more than 1000 mm, and the machine speed is preferably more than 150 m/min.

Figure 6:
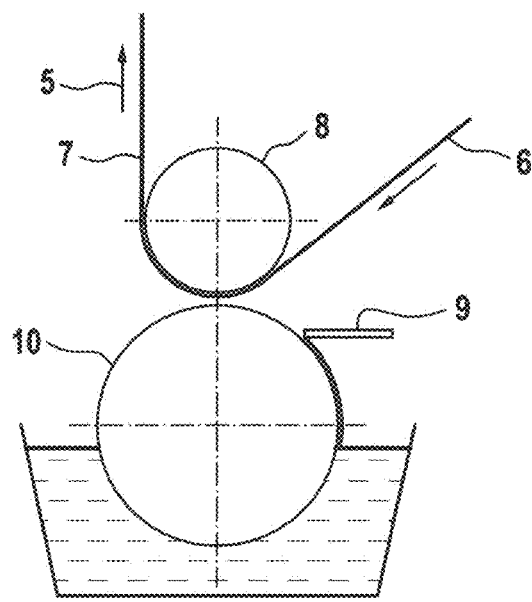
FIG. 6 is a diagram of the structure and mode of operation of a gravure roll application unit.

FIG. 6 is a diagram of the structure and mode of operation of this type of application unit. The gravure roll (=applicator roll) (10) has by way of example a diameter of from 200 to 600 mm with a steel core, applied on which there is a thin metallic layer into which cells are impressed mechanically or by means of a laser. The appearance of the cells can vary—depending on the functionality required. Typical geometries of the small cells are round, square, have a honeycomb structure, and are separate or continuous. Cell volume is moreover determined via the depth and size of the individual cells, and in turn has a decisive effect on the liquid-application process and the optical properties of the coating. Once the cells have been impressed, the gravure roll (10) is usually finally chromed. The technology depicted in the figure is termed "forward gravure". It is naturally also possible to use "reverse gravure", but preference is not given to use of this in the present case.

The peel-coating composition (corresponding to the outer layer (A) in liquid form) is applied to the biaxially oriented polyester film (B) (6) by way of a trough and the applicator roll (10). A doctor (9) is usually used to strip excess material from the applicator roll (10). From the applicator roll, the peel-coating composition is applied to the polyester film (6) which is guided over a pressure roll (8). The coated film (7) is then passed onwards into a dryer (5).

Figure 7:
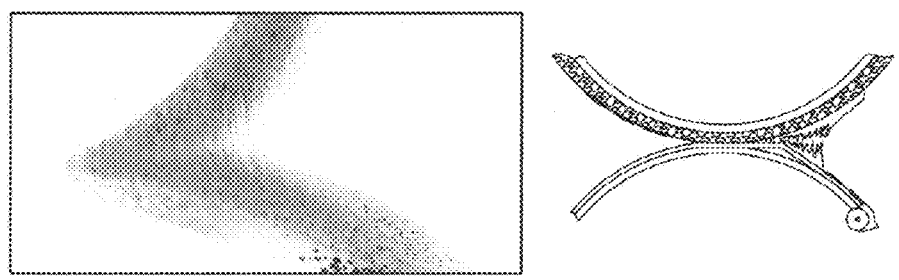
FIG. 7 is a schematic illustration of ink splitting.

The process is therefore very similar to conventional printing technology as, for example, set out in detail by M. Lake, in "Oberflächentechnik in der Kunststoffverarbeitung" [Surface technology in plastics processing], Hanser 2009. The difference from printing technology in the present case is that the peel-coating (for which the term lacquer is also used in practice) is applied over the entire surface rather than partially as in the case of printing. In relation to the mechanism of transfer of the peel-coating from the gravure roll to the substrate (=biaxially oriented polyester film), we refer at this point to the paper given by E. Dörsam (Technical University of Darmstadt, summer semester 2012), "Printing Technology for Electronics, 4. Ink Transfer in the Printing Process", Jan. 6, 2012. Transfer of the peel-coating to the polyester film is in essence achieved here via ink splitting as depicted in FIG. 7, E. Dörsam, 2012.

In order that a peelable polyester film is obtained which, directly after coating, features good handling and good winding performance, a particular process is preferably used directly after coating—before drying—to smooth the film on the coating side layer (A).

A wide variety of techniques can be used to smooth the film surface, e.g. air-knife smoothing, use of smoothing rolls over which the wet layer is passed, or smoothing with the aid of what are known as "smoothing bars".

Figure 8:
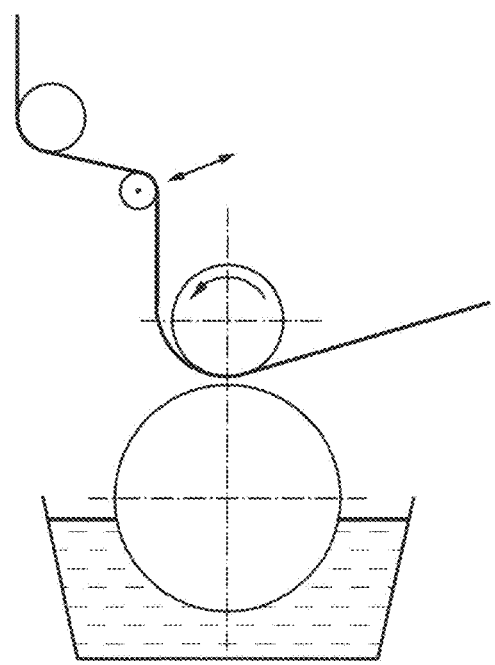
FIG. 8 is a schematic illustration of an exemplary smoothing bar process and mode of operation.

The "smoothing bar" process, see FIG. 8, is used for the production of the peelable polyester film of the invention. The "smoothing bar" consists of a rotating roll with diameter from 2 to 10 cm and with a smooth surface, which can be operated in corotation or in counter rotation.

For the purposes of good winding it has moreover proved to be advantageous here to operate the "smoothing bar" in counter rotation (reverse), where the velocity of the "smoothing bar" is about 20 to 200% of the film web velocity. The wrap angle of the film here can vary within certain limits, and depends inter alia on the viscosity of the peel-coating composition. Conventional wrap angles are in the range from 0 to 90°, preferably from 0 to 45° and particularly preferably from 0 to 20°.

Figure 9:
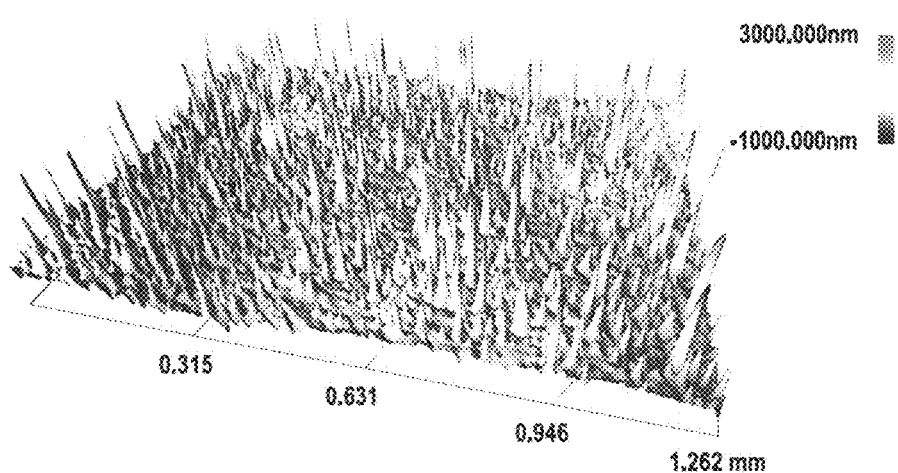
FIG. 9 is an illustration of the topography of an exemplary inventive smoothed film.

The smoothing of the coating side of the peelable polyester film gives a film that features improved winding performance in comparison with unsmoothed films. This smoothed film features a topography of the type depicted by way of example in FIG. 9.

The films smoothed by the "smoothing bar" feature an arithmetic mean value of the absolute ordinate values $S_a$ of the outer layer (A) that is smaller than 300 nm, preferably smaller than 250 nm and particularly preferably smaller than 200 nm, and a reduced peak height $S_{pk}$ which is smaller than 700 nm, preferably smaller than 690 nm and particularly preferably smaller than 680 nm.

Adherence to the following criteria during coating is moreover advantageous for the production of the peelable polyester film of the invention:

the temperature of the peel-coating composition (=lacquer) is within particular limits. The temperature of the lacquer (measured in the trough and in the feed container) is from 10 to 40° C., preferably from 16 to 28° C. and particularly preferably from 18 to 25° C. If the temperature of the lacquer is lower than 10° C., undesirable clouding occurs in the coated film. If the temperature of the lacquer is above 40° C., the coated film has undesirable blemishes.

the viscosity of the lacquer is within a particular range. The viscosity is determined by means of a DIN 4 flow cup. The viscosity of the lacquer (measured in the trough and in the feed container) is preferably from 10 to 50 s, preferably from 16 to 32 s and particularly preferably from 17 to 30 s. If the viscosity of the lacquer is below 10 s, application is non-uniform, this being discernible in that the haze of the film varies greatly. The variations are undesirable. If the viscosity of the lacquer is above 50 s, the coated film has significantly increased haze, this being likewise undesirable.

Figure 10:
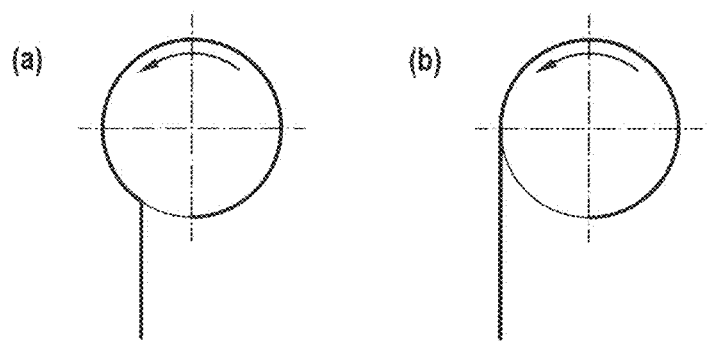
FIG. 10A is a schematic illustration of film having an offset upon parting from a roll.
FIG. 10B is a schematic illustration of film parting from tangentially from a roll.

The following findings were obtained during coating and further processing of the peelable polyester film of the invention with the layer structure A=peelable outer layer, B=biaxially oriented PET film, C=acrylic-crosslinked coating;

When the coated film is rolled up to give the jumbo roll and then samples of the peelable polyester film are peeled from the roll, no unrolling noise is detected. On unwinding, the film parts tangentially from the roll, as depicted on the right-hand side in FIG. 10(*b*).

When the coated film is further processed, e.g. when the jumbo roll is cut to give small cut rolls, no adhesion between the film laps is observed; on unwinding the film continues to part tangentially from the roll, and no unrolling noise is detected.

The winding performance of the finished peelable polyester film is very good and meets the requirements.

The dry material of the coating on the coated film remains entirely on the coated side. In particular, no break-away of the dry material ("cohesive fracture") occurs through transfer to the reverse side within a roll.

If, on the other hand, a peelable polyester film is produced with the coating (A) but without the acrylic-crosslinked coating (C), the findings are as follows.

When the coated film is rolled up to give the jumbo roll and then samples of the peelable polyester film are peeled from the roll, unrolling noise is detected. The film does not part tangentially from the roll, as depicted on the right-hand side in FIG. 10(*b*), but instead an offset is observed, as depicted in the left-hand image in FIG. 10(*a*).

When the coated film is further processed, e.g. when the jumbo roll is cut into small cut rolls after transport and storage, increased adhesion between the film laps is observed. The offset becomes significantly greater, and substantial force is required to remove the film from the roll—if it can be removed at all.

Because of the increased adhesion between the individual film laps, film break-offs occur in the machine, causing stoppage of the cutting operation. This is undesirable.

The adhesion to the reverse side can be sufficiently great to cause break-away and transfer of portions of the lacquer layer.

In summary, the winding performance of the peelable polyester film is inadequate and does not meet the requirements.

Inventive Properties

The peelable polyester film of the invention, produced by the process of the invention, has a large number of properties of which the most important are listed below.

The gloss of the surface of the layer (C) is greater than 100; in the preferred embodiment greater than 110 and in the particularly preferred embodiment greater than 120. The uncoated film surface is therefore also suitable for a further functional coating, for printing or for metallizing. The gloss of the surface of the layer (A), applied via off-line coating to the base layer (B), is greater than 70, preferably greater than 75 and particularly preferably greater than 80.

The clarity of the peelable polyester film of the invention is greater than 80%. The clarity of the peelable polyester film of the invention is preferably more than 82% and particularly preferably more than 84%. The haze of the film of the invention is less than 20%. The haze of the polyester film of the invention is preferably less than 18% and particularly preferably less than 15%. The transparency of the peelable polyester film of the invention is greater than 90. The transparency of the peelable polyester film of the invention is preferably more than 90.5 and particularly preferably more than 91.

The peel properties of the peelable polyester film of the invention are excellent. The peelable polyester film of the invention exhibits medium peel in relation to ready-meal trays made of APET and made of RPET. The peel force in the temperature range from 110 to 160° C. is in the desired range of from 3 to 7 N/15 mm. It has moreover surprisingly been found that the film of the invention also exhibits very good peel in relation to ready-meal trays made of CPET and made of ACPET and ready-meal trays made of paperboard covered with an APET layer; here again in all cases the film exhibits the desired medium peel.

The film moreover has fully satisfactory cold-peel performance. It is moreover reworkable, this being a major economic advantage. The seal seam moreover exhibits high integrity, i.e. is by way of example resistant to water and to olive oil, and passes what is known as the water and olive oil test.

The peelable polyester film features very good winding performance—even after storage at elevated temperatures. The winding performance of the invention—at an elevated temperature of the wound roll—is characterized by subjecting the films of the invention to the adhesion test (=laboratory test) described at a later stage below. The film passed the adhesion test if the force required to separate the two samples was less than 0.1 N/50 mm.

The adhesion between the biaxially oriented polyester film and the outer layer (A) applied off-line (inter-layer bond strength) is so great that when the film is peeled from the ready-meal tray the fracture preferentially takes place between the peel layer and the surface of the ready-meal tray (adhesive fracture). This in particular improves reworkability and the appearance of the ready-meal tray after peeling.

The peelable polyester film of the invention has excellent suitability for the packaging of foods and other consumable items, in particular the packaging of foods and other consumable items in ready-meal trays where peelable polyester films are used to open the packaging.

The table (Table 1) below collates inter alia the most important film properties of the invention.

TABLE 1

| Outer layer (A) | Advantageous range of the invention | Preferred | Particularly preferred | Unit | Test method |
|---|---|---|---|---|---|
| Proportion of polyester | 85-99 | 86-99 | 87-99 | % by wt. | |
| Proportion of polyester units composed of aromatic dicarboxylic acids | 25-95 | 40-90 | 50-88 | mol % | |
| Proportion of polyester units composed of aliphatic dicarboxylic acids | 5-75 | 10-60 | 12-50 | mol % | |
| Proportion of other substances | 1-15 | 1-14 | 1-13 | % by wt. | |
| Glass transition temperature of polyester | 0-30 | 0-27 | 2-25 | ° C. | in-house |
| SV value of polyester | 200-2000 | 250-1900 | 300-1900 | | in-house |
| Mass of dry outher layer (A) | 1-8 | 1.2-8 | 1.4-8 | g/m² | in-house |
| $d_{50}$ particle diameter | 2.0-8 | 2.5-7 | 3.0-6 | μm | in-house |
| Filler concentration | 0.5-10 | 0.7-8.0 | 1.0-6.0 | % | in-house |
| Properties | | | | | |
| Thickness of film | 3-200 | 4-150 | 5-100 | μm | |
| Minimal sealing temperature of OL (A) in relation to ready-meal trays made of APET and made of RPET | 115 | 112 | 110 | ° C. | in-house |
| Seal seam strength of OL (A) in ralation to ready-meal trays made of APET and made of RPET | 3-7 | 3.1-7 | 3.2-7 | N/15 mm | in-house |
| Cold-peel performance | medium peel | medium peel | medium/strong peel | | in-house |
| Arithmetic mean value of absolute ordinate values $S_a$ | <300 | <250 | <200 | nm | DIN EN ISO 25178-2 |
| Reduced peak height $S_{pk}$ | <700 | <690 | <680 | nm | DIN EN ISO 25178-2 |
| Adhesion test | <0.1 | <0.09 | <0.08 | N/50 mm | in-house |
| Glose of surfacs (C) | >80 | >90 | >100 | | DIN 67530 |
| Gloss of off-line coated surface (A) | >70 | >75 | >80 | | DIN 67530 |
| Clarity of film | >80 | >82 | >84 | % | ASTM D1003 |
| Haze of film | <20 | <18 | <15 | % | ASTMD 1003.61, Method A |

TABLE 1-continued

| Outer layer (A) | Advantageous range of the invention | Preferred | Particularly preferred | Unit | Test method |
|---|---|---|---|---|---|
| Transparency of film | >90 | >90.5 | >91 | % | |
| Shrinkage of film | <2.5 | <2.2 | <2.0 | % | DIN 40634, 150° C., 15 min. |
| Modulus of elasticity of film | >3000 | >3500 | >4000 | | ISO 527-1 and ISO 527-3; sample type 2 |

Definitions

The term "heat-sealable" means the property possessed by a multilayer polyester film which comprises at least one base layer (B) and which comprises at least one heat-sealable outer layer (A), which is amenable to bonding to a substrata made of thermoplastic material, in particular to ready-meal trays made of APET/RPET and made of CPET, by means of sealing jaws via application of heat (from 110 to 200° C.) and pressure (from 1 to 6 bar) in a particular time (from 0.1 to 2 sec), while the backing layer (=base layer (B)) does not itself become plastic. In order to achieve this, the melting point of the polymer of the layer (A) is generally significantly lower than that of the polymer of the base layer. If, by way of example, polyethylene terephthalate with melting point 254° C. is used as polymer for the base layer, the melting point of the heat-sealable layer (A) is generally significantly lower than 230° C., and in the present case preferably lower than 200° C. and particularly preferably lower than 170° C.

Figure 1:
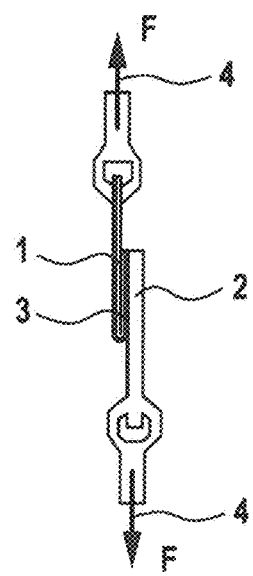
FIG. 1 is a schematic illustration of a tensile stress-strain tester and mode of operation.
Figure 2:
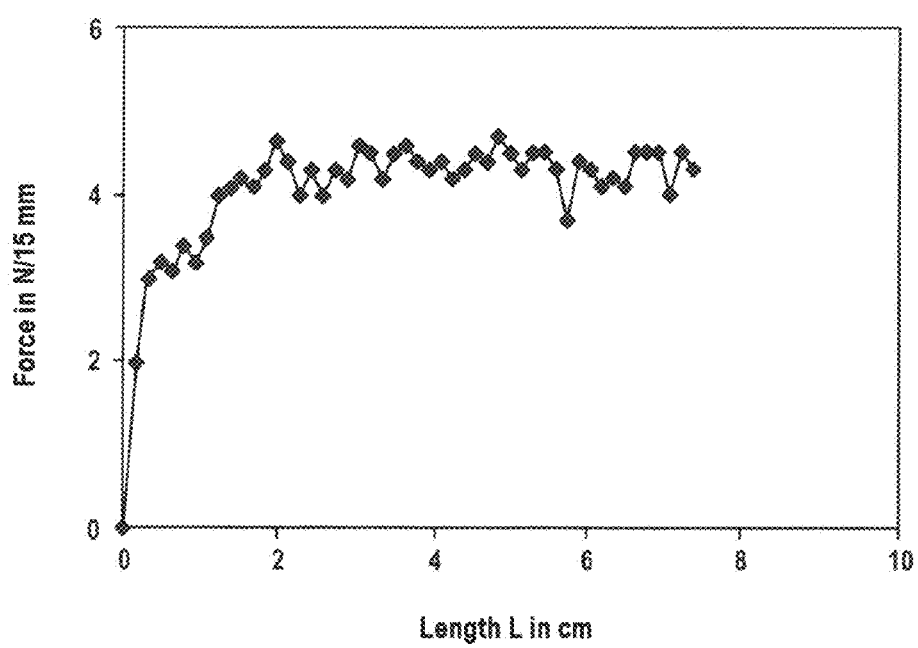
FIG. 2 is a graphical illustration of an exemplary tensile or peel force curve associated with a peelable film.

The term "peelable" means the property possessed by a polyester film which comprises at least one heat-sealable and peelable outer layer (A), which after heat-sealing on ready-meal trays made of APET/RPET and made of CPET can in turn be peeled from the ready-meal tray in a manner such that no incipient tearing or break-off of the film occurs during this procedure. When the film is peeled from the ready-meal tray, the composite made of heat-sealable film and ready-meal tray generally parts at the seam between the heat-sealable layer and the surface of the ready-meal tray (cf. also Ahlhaus, O.E.: Verpackung mit Kunststoffen [Packaging with plastics], Carl Hanser Verlag, p. 271, 1997, ISBN 3-446-17711-6). When the film heat-sealed onto a test strip of the ready-meal tray is peeled at a peel angle of 180° in accordance with FIG. 1 in a tensile tester, the resultant peel performance of the film is in accordance with FIG. 2. During initial peeling of the film from the substrate, the force required for this purpose increases in accordance with FIG. 2 up to a particular value (e.g. 5 N/15 mm), and then remains approximately constant over the entire peel distance, although with relatively large variations (about +/−20%).

The term "cold peel" means the property possessed by a peelable polyester film which retains its previously defined peelability after storage in a refrigerator at conventional temperatures (from 2 to 8° C.). Cold peel performance is conventionally tested as follows: the heat-sealed pack is placed in the refrigerator and remains there for about 15 min. The pack is removed from the refrigerator and the film is then immediately peeled manually from the ready-meal tray. It must peel in its entirety here, i.e. no tearing or incipient tearing or tear-propagation is permitted in the film during this procedure. The magnitude of the peel force should correspond here to "medium peel".

The term "reworkability" means the property possessed by a peelable polyester film which can be peeled from the ready-meal tray directly after heat-sealing, without losing its peelability during this procedure. When sealed packs are produced it is expected that some scrap will arise, an example being a defective seal. The inspector of the line removes the defective tray from the belt, and the peelable polyester film is peeled from the ready-meal tray. The film possesses the "reworkable" property if, during this procedure, it can be peeled in its entirety from the ready-meal tray with no incipient tearing. The ready-meal tray is then either sealed by means of a manually operated device or replaced in the line for sealing. The procedure takes place a the temperature prevailing in the factory (from 4 to 10° C.).

Integrity in relation to water and olive oil. The film exhibits the desired integrity if it has passed what is known as the water and olive oil test. In this test, before heat-sealing, a quantity of water or olive oil is placed in the ready-meal tray and is sufficient to provide a liquid layer of height about 3 cm when the sealed ready-meal tray is placed vertically, resting on the seal seam. The film passes this test if no liquid has escaped after a storage time of at least 14 days (in upright position with 3 cm of liquid column acting on the sealable layer).

The following test methods were used to characterize the raw materials and the films for the purposes of the present invention:

Seal Seam Strength (Determination of Peel Force)

Seal seam strength is determined by placing a film strip (length 100 mm×width 15 mm) onto the internal side of corresponding strip of the ready-meal tray made of APET/RPET (this strip being cut out from the base of the tray), and sealing the said film strip with the temperature set to ≥110° C., with a sealing time of 0.5 s and a "sealing pressure" of 460 N (HSG/ET sealing equipment from Brugger, single-side-heated sealing jaw). In accordance with FIG. 2, after a time of about 2 h the sealed strips are clamped into the tensile tester (e.g. Zwick), and the 180° seal seam strength is determined, i.e. the force required to separate the test strips, using a peel velocity of 200 mm/min. Seal seam strength is stated in N per 15 mm of film strip (e.g. 3 N/15 mm).

Determination of Minimal Sealing Temperature

HSG/ET sealing equipment from Brugger is used, as described previously for seal seam strength measurement, to produce heat-sealed samples (seal seam 15 mm×100 mm), the film being sealed at various temperatures with the aid of a single-side-heated sealing jaw with sealing pressure 460 N and sealing time 0.5 s. 180° seal seam strength was measured as in the determination of seal seam strength. The minimal sealing temperature is the temperature in ° C. at which a seal seam strength of at least 3 N/15 mm is achieved, where the minimal sealing temperature is always above 80° C.

Glass Transition Temperatures Tg

Glass transition temperature Tg was determined on film samples with the aid of DSC (Differential Scanning Calorimetry). A DSC 1090 from Perkin-Elmer was used. Heating rate was 20 K/min, and input weight was about 12 mg. Thermal history was eliminated by first heating the samples to 300° C., holding for 5 minutes, and then quenching with liquid nitrogen. The glass transition temperature Tg was determined from the thermogram as the temperature at half transition height.

Standard Viscosity SV

Standard viscosity in dilute solution SV was determined by a method based on DIN 53 728 Part 3, in an Ubbelohde viscometer at $(25\pm0.05)°$ C. Dichloroacetic acid (DCA) was used as solvent instead of a mixture of phenol and 1,2-dichlorobenzene. The concentration of the dissolved polymer was 1 g of polymer/100 ml of pure solvent. Dissolution of the polymer took 1 hour at 60° C. If the samples had not dissolved completely after this time, up to two further attempts at dissolution were made, in each case for 40 minutes at 80° C., and the solutions were then centrifuged for 1 hour with rotation rate 4100 rpm. The dimensionless SV value is determined as follows from the relative viscosity ($\eta_{rel}=\eta/\eta_s$):

$$SV=(\eta_{rel}-1)\times 1000$$

The particle content in the film or polymer was determined by ashing with correction via appropriate increase of input weight. This means:

input weight=(input weight corresponding to 100% of polymer)/[(100−particle content in % by weight)/100]

Haze, Clarity and Transparency

A Hazegard XL-211 haze meter from BYK Gardner was used for measurement on the coated polyester films. Holz haze was determined in accordance with ASTM D1003-61, Method 1, Clarity is measured in accordance with ASTM D1003 by means of a Hazegard, but now at the "clarity port" of the test equipment. Transparency is measured in accordance with ASTM D1033-77.

20° Gloss

Gloss is determined in accordance with DIN 67530. Reflectance is measured, this being an optical value characteristic of a film surface. Using a method based on the standards ASTM D523-78 and ISO 2813, the angle incidence is set at 20°. A beam of light hits the flat test surface at the set angle of incidence and is reflected or scattered by the surface. A proportional electrical variable is displayed representing light rays incident on the photoelectronic detector. The value measured is dimensionless and must be stated with the angle of incidence.

Modulus of Elasticity

Modulus of elasticity is measured in accordance with ISO 527-1 and ISO 527-3, sample type, test velocity 100%/min, 23° C., 50% r.h, Shrinkage Shrinkage of the film is measured in accordance with DIN 40638 at a temperature of 150° C. and with a shrinkage time of 15 min.

Antifogging Properties

For the determination of antifogging properties, the surface tension of the sealable side (A) is first measured in mN/m 1 day after production of the peelable polyester film. Krüse DS 100 equipment is used for this in accordance with the operating instructions provided.

Determination of Anticondensation Effect

The anticondensation properties of the polyester films were determined as follows in a laboratory controlled to 23° C. and 50% relative humidity, film samples were sealed to a ready-meal tray (length about 17 cm, width about 12 cm, height about 3 cm) made of amorphous PET and comprising about 50 ml of water.

The trays are stored in a refrigerator controlled to 4° C., and removed for assessment after respectively 10 and 30 minutes and 4, 8 and 24 hours. Formation of condensate on cooling of the air from 23° C. to refrigerator temperature was tested. A film equipped with an effective anticondensation agent is transparent even after formation of condensate, because by way of example the condensate forms a coherent, transparent film. In the absence of an effective anticondensation agent, formation of a fine mist of droplets on the film surface reduces the transparency of the film in the most disadvantageous case, the contents of the ready-meal tray become invisible.

Another test method is known as the hot fogging test. For this, a 250 ml glass beaker comprising 50 ml of water and covered by the film to be tested is placed in a water bath controlled to 70° C. The assessment method is the same as described above. This test can also be used to test the long-term anticondensation effect or wash-off resistance of the film, because the vapour condenses continuously on the film and in turn runs off or drips off. Substances that are readily soluble are thus washed off, and the anticondensation effect decreases.

Measurement of Median Diameter $d_{50}$

A Malvern Mastersizer 2000 is used to determine the median diameter $d_{50}$ of the particle to be used. For this, the samples are placed in a cell with water, and this is then inserted into the test equipment. A laser is used to analyse the dispersion, and the particle size distribution is determined from the signal by comparison with a calibration curve. Two parameters characterize the particle size distribution: the median value $d_{50}$ (=a measure of the position of the central value) and the degree of scattering, known as SPAN98 (=a measure of particle diameter scattering). The test procedure is automatic, and also includes mathematical determination of the $d_{50}$ value. The $d_{50}$ value here is defined as determined from the (relative) cumulative particle size distribution curve: the intersection of the 50% ordinate value with the cumulative curve provides the desired $d_{50}$ value on the abscissa axis.

Measurements on the film produced using these particles give a $d_{50}$ value lower by from 15 to 25% than that of the particles used.

Topography (White Light Interferometry)

The topography of the surface is determined with a Contour GT-K/A white light interferometry microscope from Bruker, with Vision 64 measurement software, Version 5.6, in accordance with ISO 16610-19 (waviness filtering) and ISO 25178-2 (roughness parameters). An area of 0.95 mm×1.27 mm (480×640 pixels) is measured at 5.1× optical magnification. In order to produce an ideally reflective layer for surface topography measurement, a layer of pure silver, thickness 10 nm, is sputtered vertically, in a Polaron SC7680 sputter coater onto the film surface to be measured.

For the measurement, a piece of film measuring 10×10 cm is clamped between two metal rings of diameter 4 cm in a manner such that no waviness of the film specimen can be observed visually.

The measurement is made in VSI (vertical scanning interferometry) mode. With the following exceptions, all the measurement parameters are set to the standard values supplied with the software: measurement length in z-direction (=thickness direction of the film) is set to 25 μm (backscan length=10 μm, scan length=15 μm). Under these standard measurement conditions (advance velocity 1×, modulation threshold=5%), the proportion of unrecognized pixels is less than 10%. A computer-based method (Data Restore) is used to supply missing measured values at the edges of the elevations.

All of the S-parameters below are calculated from the S-F surface. $S_a$ is the arithmetic mean value of the absolute ordinate values within the defined range (A):

$$S_a = \frac{1}{A} \int\int_A |z(x, y)| dx dy$$

The reduced peak height $S_{pk}$ is the mean height of the protruding peaks above the core part of the surface. The calculation methods for the $S_a$- and $S_{pk}$-parameters are given in the standard ISO 25178-2.

The $S_a$- and $S_{pk}$-values for a sample are mean values from 5 different randomly selected measurement sites. In the event that the $S_{pk}$-value at a measurement site is greater than 800 nm, the measurement is made at a further 5 randomly selected measurement sites, and all of the measured values for the sample are then included in the calculation of the mean values.

Adhesion Test

Film samples measuring 5 cm×5 cm are cut out from the film web. Two of these film samples are mutually superposed in a manner that brings the side (A) into contact with the side (C). A paper release layer is placed onto these two films. Five such layers (two peelable polyester films, one paper layer) are combined to give a stack, placed in an oven, and loaded with a 10 kg weight. The oven was previously set to the desired temperature (from 20 to 100° C.). The stack is kept in the oven for 1 hour, and then removed. Directly thereafter (within 1 h), each of the 5 pairs of films is clamped into the tensile tester (e.g. Zwick) for determination of adhesion in the 180° test (see seal seam strength) in accordance with FIG. 1, and 180° seal seam strength Is determined, i.e. the force required to separate the test strips, with peel velocity 200 mm/min. The force required to separate the two strips is stated in N per 50 mm of film strip (e.g. 0.05 N/50 mm).

The invention is explained in more detail below with reference to Examples.

INVENTIVE EXAMPLE 1

I Production of the Biaxially Oriented Polyester Film (BOPET)

The conventional process (longitudinal and transverse orientation) was used to produce a biaxially oriented film made of polyethylene terephthalate with thickness 23 μm. To this end, polyethylene terephthalate chips were introduced into the extruder for the base layer (B"). Polyethylene terephthalate chips and particles were likewise introduced into the extruder (twin-screw extruder) for the layer (B'). The raw materials were melted and homogenized in the two respective extruders in accordance with the process conditions listed in the table below.

The three melt streams for the layer (B') and the two layers) (B') were then laminated in a three-layer die via coextrusion, and discharged by way of the die lip. The resultant melt film was cooled, and a transparent, three-layer film with B'B"B' structure, total thickness 23 μm, was then produced by way of stepwise orientation in longitudinal and transverse direction. The thicknesses of the two layers (B') are respectively 1 μm.

The acrylic-crosslinked coating (C) of the invention comprises a 4.5% by weight solution of a latex consisting of a copolymer of 60% by weight of methyl methacrylate, 35% by weight of ethyl acrylate and 5% by weight of N-methylolacrylamide and of a surfactant. The coating (C) was applied to one of the layers (B') of the longitudinally stretched film which, for this purpose, was corona-treated on that side immediately prior to this application. The reverse gravure process was used to coat the film with the dispersion described above, the dry weight of the coating (based on the biaxially oriented film) being about 0.035 g/m².

Coextruded Base (B"):
100% by weight of PET with SV value 800
Both Coextruded Layers (B'), Mixture of:
85% by weight of PET with SV value 790
15% of masterbatch made of 99 by weight of PET (SV value: 790) and 1.0% by weight of Sylobloc 44 H (synthetic $SiO_2$), $d_{50}$=2.5 μm The production conditions in the individual steps were

| Extrusion | Temperatures for layer B' and layer B" | 280 | ° C. |
| | Take-off roll temperature | 20 | ° C. |
| Longitudinal stretching (NTEP) | Heating temperature | 70-120 | ° C. |
| | Stretching temperature | 115 | ° C. |
| | Longitudinal stretching ratio (LOE = 1.7 and REP = 2.65) | 4.5 | |
| Transverse stretching | Heating temperature | 100 | ° C. |
| | Stretching temperature | 135 | ° C. |
| | Transverse stretching ratio | 4.0 | |
| Setting | Temperature | 230 | ° C. |
| | Duration | 3 | s |

II Production of the Off-Line-Coated Peelable Polyester Film

The BOPET film was coated off-line with a peel-coating composition to form the outer layer (A) in accordance with the data below, using a gravure roll (forward gravure). The outer layer (A) was then smoothed by means of a smoothing bar. The smoothing bar was operated at a velocity corresponding to 100% of the film web velocity, but in the opposite direction. Dry mass (=outer layer (A)) was 2.5 g/m².

Coating composition (cf. in this connection also Table 2):

| 27.8% by weight of | polyester (30 mol % of DMT units, 40 mol % of DMI units and 30 mol % of sebacate units, and 44 mol % of EG units and 56 mol % of neopentyl glycol units). |
| 0.2% by weight of | Sylysia 430 (synthetic $SiO_2$, Fuji, Japan) with particle diameter $d_{50}$ = 3.4 μm |
| 2% by weight of | antifogging agent: sodium diethyl sulfosuccinate (Lutensit A BO from BASF SE) |
| 70% by weight of | ethyl acetate |

The $T_g$ of the peel polyester is 11° C., and the SV value of the peel polyester is 500. The viscosity of the lacquer was 25 s, and the temperature of the lacquer was 19.5° C.

Table 2 shows the respective proportions of the dicarboxylic acids and glycols in mol present in the peel polymer, and also other information relating to the film of the invention.

Figure 3:
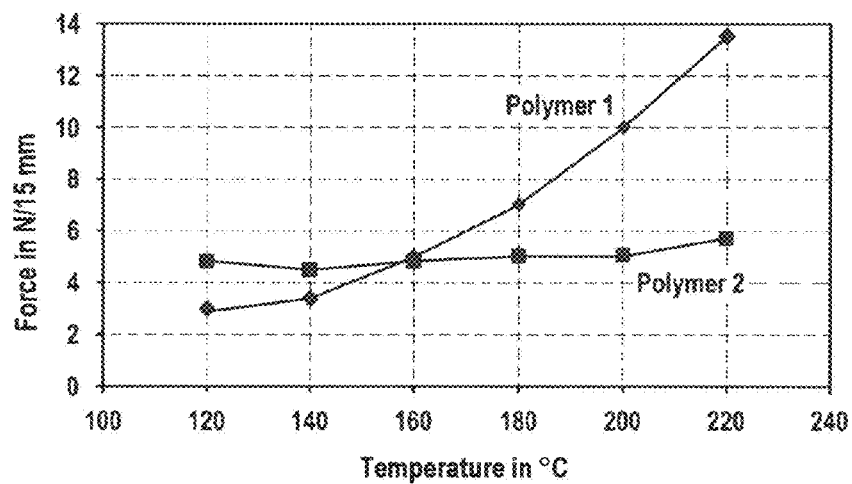
FIG. 3 is a graphical illustration of a peel force curve.

Table 3 presents the properties of the film. The measured minimal sealing temperature of the film (column 2) in relation to ready-meal trays made of APET and made of RPET is 120° C. The film was sealed at 120, 130, 140 and 150° C. to ready-meal trays made of PET (produced by Faerch K2171-1A, transparent) (sealing pressure 460 N, sealing time 0.5 s). Strips of the composite made of film of the invention and ready-meal tray made of APET were then pulled apart in accordance with the abovementioned test specification by means of a tensile stress strain tester. For all sealing temperatures, the desired peeling of the films from the ready-meal tray was observed in accordance with FIG. 3, Polymer 2. Column 3 lists the seal seam strengths measured. For all sealing temperatures, peelable films were attained; cold-peel performance, which is so important, was also fully satisfactory. The seal seam strengths, close to 5 N/15 mm, were in the moderate range, i.e. controlled exertion of force was sufficient to peel the films from the ready-meal tray (=medium peel). The film moreover had the desired good optical properties and exhibited the desired handling and the desired processing performance, in particular the desired winding performance.

Winding performance was further investigated by carrying out the adhesion test on the film in the region up to 100° C. oven temperature. For all oven temperatures, the adhesion test gave a value below 0.1 N/50 mm.

INVENTIVE EXAMPLE 2

Inventive Example 1 was modified in that the dry mass of the sealable layer (A) was increased to 4.5 g/m², while film structure and production method were otherwise identical. The minimal sealing temperature of the film in relation to ready-meal trays made of APET and made of RPET is now 111° C. For all sealing temperatures, the films exhibited the desired peeling from the ready-meal tray in accordance with FIG. 3, Polymer 2. Column 3 lists the seal seam strengths measured. For all sealing temperatures, films obtained were again peelable, i.e. also cold-peelable. The seal seam strengths of the films of the invention are significantly higher than in Inventive Example 1. Haze measured for the film was somewhat higher; the handling and winding performance of the film was as in Inventive Example 1. The adhesion test likewise gave a value below 0.1 N/50 mm for all oven temperatures. The peelable polyester film according to this example has the advantage that it can also seal ready-meal trays which have poor sealing properties; these can in particular be encountered among ready-meal trays made of RPET.

INVENTIVE EXAMPLE 3

Inventive Example 1 was modified in that the composition of the lacquer for the sealable outer layer (A) was changed, while the film structure was otherwise identical. The lacquer now consists of the following proportions of raw materials:

| | |
|---|---|
| 27.8% by weight of | polyester (45 mol % of DMT units, 32 mol % of DMI units, 10 mol % of sebacate units and 13 mol % of adibate units, and 35 mol % of EG units, 25 mol % of DEG units, 15 mol % of PD units, 6 mol % of BD units and 19 mol % of neopentyl glycol units). |
| 0.2% by weight of | Sylysia 430 (synthetic $SiO_2$, Fuji, Japan) with particle diameter $d_{50}$ = 3.4 μm |
| 2% by weight of | antifogging agent: Lutensit A BO from BASF SE |
| 70% by weight of | ethyl acetate |

The minimal sealing temperature of the film in relation to ready meal trays made of APET is 113° C. For all sealing temperatures, the desired peeling of the films from the ready-meal tray was observed in accordance with FIG. 3, Polymer 2. Column 3 lists the seal seam strengths measured. For all sealing temperatures, peelable films were again obtained. The seal seam strengths of the films of the invention are higher than in Inventive Example 1.

They are in a moderate range, and it is therefore possible to peel the film from the ready-meal tray without exerting substantial force. The handling, processing performance, and in particular winding performance of the film were as in Inventive Example 1.

COMPARATIVE EXAMPLE 1

Example 1 from EP 1 475 228 B1 was repeated. Table 3 presents the properties of the film. Although the film has a high level of pigmentation, and the pigments represent points of weakness in the sealable layer, no peelable film was obtained for any of the stated sealing temperatures. On peeling of the film from the ready-meal tray, incipient tearing of the film occurred, and the force-distance graph of the film was in accordance with FIG. 3, Polymer 1. The film exhibits "weldable" behaviour, and is therefore unsuitable for achievement of the object.

COMPARATIVE EXAMPLE 2

Example 1 of EP 2 431 176 B1 was repeated. The film was sealed at 120° C. to ready-meal trays made of APET (produced by Faerch K2171-1A, transparent) (sealing pressure 460 N, sealing time 0.5 s). Strips of the composite made of film and ready-meal tray made of APET were then pulled apart in accordance with the abovementioned test specification by means of a tensile stress-strain tester. The desired peel performance was not found; the peel force, 2.1 N/15 mm, was too small.

COMPARATIVE EXAMPLE 3

Inventive Example 1 was modified in that a peelable polyester film was produced without the acrylic-crosslinked coating (C). When the coated film was rolled up and then samples of the peelable polyester film were peeled from the roll, unrolling noise was detected. After transport and storage of the jumbo roll (at elevated temperatures, up to 50° C.), this was cut into small cut rolls. When the film was unrolled from the jumbo roll here, increased adhesion between the film laps was observed. The high adhesion between the individual film laps caused film break-offs in the machine, leading to stoppage of the cutting operation.

The winding performance of the peelable polyester film is unsatisfactory, and does not meet the requirements. Irrespective of this, a value above 0.1 N/50 mm was detected in the adhesion test for oven temperatures greater than or equal to 60° C.

TABLE 2

| | | Composition of polyester for the formation of outer layer (A) | | | | | | | | | | | Glass transition temperature of polyester ° C. | SV value of polyester | Film structure | Film thickness, about μm | Mass of outer layer (A) g/m² | Antifogging agent and concentration in layer (A) | Particles in B' of biaxially oriented polyester film | |
|---|---|---|---|---|---|---|---|---|---|---|---|---|---|---|---|---|---|---|---|---|
| | | Dicarboxylic acids | | | | | Diols | | | | | | | | | | | | | |
| | | DMT | DMI | AzS mol % | SeS | AdS | EG | DEG | 1,2-PD mol % | BD | NG | | | | | | | Diameter μm | Concentration % by wt. |
| Inventive Examples | 1 | 30 | 40 | | 30 | | 44 | | | | 56 | 11 | 500 | ABC* (coated) | 25 | 2.5 | Lutensit A BO BASF SE/2 | 3.4 | 0.20 |
| | 2 | 30 | 40 | | 30 | | 44 | | | | 56 | 11 | 500 | ABC* (coated) | 25 | 4.5 | Lutensit A BO BASF SE/2 | 3.4 | 0.20 |
| | 3 | 45 | 32 | 10 | | 13 | 35 | 25 | 15 | 7 | 18 | 12 | 500 | ABC* (coated) | 25 | 2.5 | Lutensit A BO BASF SE/2 | 3.4 | 0.20 |
| Comp. Example | 1 | | | | | | | | | | | 75 | | ABC** (coex.) | 25 | 1 | | 3.4 | 5 |
| | 2 | 45 | — | 55 | | — | 100 | | | | | −15 | | AB** (coex.) | 25 | | | | |

Abbreviations:
DMT dimethyl cerephthalate,
DMI dimethyl isophthalate,
EG ethanediol,
DEG diethylene glycol,
PD propanediol,
HD butanediol,
NG neopentyl glycol,
AzS azelate,
SeS sebacate,
AdS adipate
*The layers A and C are coatings and were applied by way of an off-line or in-line coating process.
**The layers A and C are outer-layer modifications of a coextruded biaxially oriented ABC or AB polyester film.

TABLE 3

| | | Minimal sealing temperature ° C. | Seal seam strength in relation to ready-meal trays made of APCT at temperature in ° C. | | | | Cold peel and reworkability | Haze % | Clarity % | Gloss | | Transparency % |
|---|---|---|---|---|---|---|---|---|---|---|---|---|
| | | | 120 | 130 | 140 | 150 | | | | Side A | Side B | |
| Inventive Examples | 1 | 120 | 4.2 | | 4.7 | 5.2 | ++++ | 11 | 92 | 75 | 130 | 90.5 |
| | 2 | 116 | 4.8 | | | | ++++ | 12 | 91 | 74 | 130 | 90.2 |
| | 3 | 113 | 4.9 5.8 5 | 5.2 | 5.7 5.7 | 5.8 5.6 | ++++ | 10 | 91 | 79 | 130 | 90.8 |
| Comparative Examples | 1 | 130 | 1.7 | 2.5 | 5 | 8 | − | 23 | 85 | 55 | 130 | |
| | 2 | 120 | 1.7 | 2.1 | 2.2 | 2 | | | | | | |

| | | Arithmetic mean value of the absolute ordinate values Sa | | Reduced peak height Spk Side A | Modulus of elasticity | Shrinkage | Antifogging performance | Water and olive oil test | Winding performance |
|---|---|---|---|---|---|---|---|---|---|
| | | Side A | Side C nm | nm | N/mm² | % | | | |
| Inventive Examples | 2 | 135 | 60 | 551 | 4500 | 2.1 | good passed | passed | very good |
| | 2 | 175 | 60 | 581 | 4300 | 2.1 | good passed | passed | very good |
| | 3 | 136 | 60 | 551 | 4600 | 2.1 | good passed | passed | very good |

TABLE 3-continued

| | | | | | |
|---|---|---|---|---|---|
| Comparative Examples | 1 2 | 310 | 60 | | good |

Cold peel
++++ At all sealing temperatures, film is "peeled" from the ready-meal tray without any resultant incipient tearing or tear propagation. Fully satisfactory, clean peeling of the film in its entirety from ready-meal tray extending into the higher-temperature region, with high seal seam strength (medium peel).
− At all sealing temperatures, incipient tearing of the film occurs on peeling from the ready-meal tray.

That which is claimed:

1. Transparent peelable polyester film comprising a biaxially oriented polyester film having a base layer (B) which has a first and a second surface, and comprising, applied on the first surface of the base layer (B), a further layer (C), and comprising, applied on the second surface of the base layer (B), a heat-sealable outer layer (A) that is peelable in relation to ready-meal trays made of APET and made of RPET,
where the heat-sealable and peelable outer layer (A) is an off-line coating comprising
(a) from 85 to 99% by weight of peelable polyester and
(b) from 1 to 15% by weight of other substances,
where the peelable polyester is comprised of from 25 to 95 mol % of units derived from at least one aromatic dicarboxylic acid and from 5 to 75 mol % of units derived from at least one aliphatic dicarboxylic acid, where the sum of the dicarboxylic-acid-derived molar percentages is 100 and
the peelable polyester is comprised of at least 10 mol % of units derived from linear or branched diols having more than 2 carbon atoms, where the entirety of the diol components provides 100 molar percent and
the layer (C) comprises crosslinked acrylate- and/or methacrylate-based copolymers, and wherein said film has a shrinkage of less than 2.5% at 150° C. after 15 minutes.

2. Polyester film according to claim 1, wherein the other substances of the outer layer (A) are selected from the group consisting of: particles, additives, auxiliaries, lubricant, antifogging agent and mixtures of the same.

3. Polyester film according to claim 1, wherein the film has (i) a minimal sealing temperature in relation to ready-meal trays made of APET or made of RPET of 110° C. to 113° C. and a maximal sealing temperature of about 160° C., and (ii) a seal seam strength or peel force in relation to ready-meal trays made of APET and made of RPET of at least 3.0 N.

4. Polyester film according to claim 3, wherein the film exhibits a peel force that is described by the following formula which relates the peel force F in relation to ready-meal trays made of APET and made of RPET to the sealing temperature (in ° C.):

$$0.018 \cdot \theta/° C.+1 \leq \text{peel force } F/N \text{ per 15 mm} \leq 0.03 \cdot \theta/° C.+2.5.$$

5. Polyester film according to claim 1, wherein the peelable polyester of the outer layer (A) comprises the following dicarboxylic-acid-derived units and diol-derived units, based in each case on the total quantity of dicarboxylic-acid-based and, respectively, diol-based repeat units:
from 25 to 85 mol % of terephthalate,
from 5 to 50 mol % of isophthalate,
from 5 to 50 mol % of adipate,
0 mol % of azelate,
from 5 to 50 mol % of sebacate,
more than 10 mol % of ethylene glycol,
more than 10 mol % of one or more diols selected from the group consisting of: $C_3$ to $C_7$ diols, and di-, tri- or tetra-$C_2$ to $C_4$ alkylene glycols.

6. Polyester film according to claim 1, wherein the peelable polyester of the outer layer (A) has a glass transition temperature of from 0 to 30° C.

7. Polyester film according to claim 1, wherein the peelable polyester in outer layer (A) has a glass transition temperature, $T_g$, ranging from 11° C. to 30° C.

8. Polyester film according to claim 1, wherein the peelable polyester of the outer layer (A) has an SV value of from 200 to 2000.

9. Polyester film according to claim 1, wherein the outer layer (A) comprises polymer consisting of polyester and one or more anionic surfactants as antifogging agents in a total concentration of from 0.01 to 5% by weight, and the film has a peel force ranging from 3 to 7 N per 15 mm in relation to ready-meal trays made of RPET.

10. Polyester film according to claim 1, wherein the base layer (B) has a plurality of layers with a structure B'B"B' or B'B"B'".

11. Polyester film according to claim 1, wherein the peelable polyester film has a the total thickness of from 3 to 200 μm, and the base layer (B) has a proportion, based on the total thickness, of from 45 to 97%.

12. Process for the production of a polyester film according to claim 1 comprising
melting polymer for the base layer (B), which has a first and a second surface, or a plurality of polymers for the individual layers B', B" and B'" or B', B" and B' of the base layer (B) in one or more extruders,
shaping the melted polymer in a single-layer die or coextrusion die to give a flat melt film,
then drawing off the flat melt film with the aid of a chill roll,
biaxially stretching the chilled film,
heat-setting and rolling up the heat-set film,
wherein the biaxial stretching comprises longitudinal stretching and transverse stretching,
and where the process further comprises forming the outer layer (A) by applying a peel-coating composition in liquid form to the first surface of the base layer (B) off-line by conventional coating technology, drying the applied peel-coating, and winding up the resultant peel-coated film, where the process further comprises forming the layer (C) by
(i) applying, between the longitudinal stretching and the transverse stretching, a coating composition in-line in liquid form to the second surface of the base layer (B) to form the layer (C), or
(ii) applying, before or after the off-line coating with the outer layer (A), a coating composition in liquid form off-line to the second surface of the base layer by means of conventional coating technology, to form the layer (C).

13. Process according to claim 12, wherein the peel-coating composition has a temperature (measured in a trough and in a feed container) of from 10 to 40° C.

14. Process according to claim 12, wherein the peel-coating composition exhibits a viscosity—measured in a trough in a feed container by means of flow cup in accordance with the Zahn method No. 2-is from 10 to 50 s.

15. Sealable film comprising a polyester film according to claim 1.

16. Ready-meal trays made of APET and/or made of RPET comprising sealable film according to claim 15.

17. Transparent peelable polyester film comprising a biaxially oriented polyester film having a base layer (B) which has a first and a second surface, and comprising, applied on the first surface of the base layer (B), a further layer (C), and comprising, applied on the second surface of the base layer (B), a heat-sealable outer layer (A) that is peelable in relation to ready-meal trays made of APET and made of RPET, where the heat-sealable and peelable outer layer (A) is an off-line coating comprising
(a) from 85 to 99% by weight of peelable polyester and
(b) from 1 to 15% by weight of other substances,
where the peelable polyester is comprised of from 25 to 95 mol % of units derived from at least one aromatic dicarboxylic acid and from 5 to 75 mol % of units derived from at least one aliphatic dicarboxylic acid, where the sum of the dicarboxylic-acid-derived molar percentages is 100 and
the peelable polyester is comprised of at least 10 mol % of units derived from linear or branched diols having more than 2 carbon atoms, where the entirety of the diol components provides 100 molar percent,
the layer (C) comprises crosslinked acrylate- and/or methacrylate-based copolymers the base layer (B) comprises particles, and wherein said film has a shrinkage of less than 2.5% at 150° C. after 15 minutes.

* * * * *